(12) United States Patent
Kawauchi et al.

(10) Patent No.: US 8,681,850 B2
(45) Date of Patent: Mar. 25, 2014

(54) SIGNAL PROCESSING APPARATUS, SIGNAL PROCESSING METHOD AND PROGRAM

(75) Inventors: Hidetoshi Kawauchi, Kanagawa (JP);
Naoki Yoshimochi, Kanagawa (JP);
Kazukuni Takanohashi, Saitama (JP)

(73) Assignee: Sony Corporation, Tokyo (JP)

( * ) Notice: Subject to any disclaimer, the term of this patent is extended or adjusted under 35 U.S.C. 154(b) by 262 days.

(21) Appl. No.: 13/236,005

(22) Filed: Sep. 19, 2011

(65) Prior Publication Data

US 2012/0106619 A1 May 3, 2012

(30) Foreign Application Priority Data

Oct. 27, 2010 (JP) ................................ 2010-241310

(51) Int. Cl.
*H03H 7/30* (2006.01)
*H03H 7/40* (2006.01)
*H03K 5/159* (2006.01)

(52) U.S. Cl.
USPC ........... 375/232; 375/260; 375/350; 375/230; 375/233; 375/235; 455/307; 455/296; 708/322; 708/323

(58) Field of Classification Search
USPC ......... 375/260, 350, 229, 230, 232, 233, 235, 375/346; 455/307, 296; 708/322, 323
See application file for complete search history.

(56) References Cited

U.S. PATENT DOCUMENTS

| 8,284,829 B2 * | 10/2012 | He ................................ 375/232 |
| 2010/0086076 A1 * | 4/2010 | Lakkis .......................... 375/285 |
| 2011/0142098 A1 | 6/2011 | Kawauchi et al. |
| 2011/0142176 A1 | 6/2011 | Yokokawa et al. |

OTHER PUBLICATIONS

Zi-Wei Zheng, et al., "Novel Synchronization for TDS-OFDM-Based Digital Television Terrestrial Broadcast Systems", IEEE Transactions on Broadcasting, vol. 50, No. 2, Jun. 2004, pp. 148 to 153.
U.S. Appl. No. 13/235,917, filed Sep. 19, 2011, Ikegaya, et al.
U.S. Appl. No. 13/242,754, filed Sep. 23, 2011, Yoshimochi, et al.
U.S. Appl. No. 13/235,816, filed Sep. 19, 2011, Yoshimochi, et al.
U.S. Appl. No. 13/235,864, filed Sep. 19, 2011, Yoshimochi, et al.
Dazhi He, et al., "Error Rotated Decision Feedback Equalizer for Chinese DTTB Receiver", 2008 IEEE Symposium on Broadband Multimedia Systems and Broadcasting, 2008, 5 Pages.
Ming Liu, et al., "A Combined Time and Frequency Algorithm for Improved Channel Estimation in TDS-OFDM", 2010 IEEE International Conference on Communications (ICC), 2010, 6 Pages.
Zi-Wel Zheng, et al., "Novel Synchronization for TDS-OFDM-Based Digital Television Terrestrial Broadcast Systems", IEEE Transactions on Broadcasting, vol. 50, No. 2, Jun. 2004, pp. 148 to 153.

* cited by examiner

*Primary Examiner* — Phuong Phu
(74) *Attorney, Agent, or Firm* — Oblon, Spivak, McClelland, Maier & Neustadt, L.L.P.

(57) ABSTRACT

A signal processing apparatus includes a signal processing unit configured to carry out signal processing on a single-carrier signal and a multi-carrier signal by making use of a plurality of common filters shared by the single-carrier signal and the multi-carrier signal.

8 Claims, 18 Drawing Sheets

TRANSMISSION SYSTEM

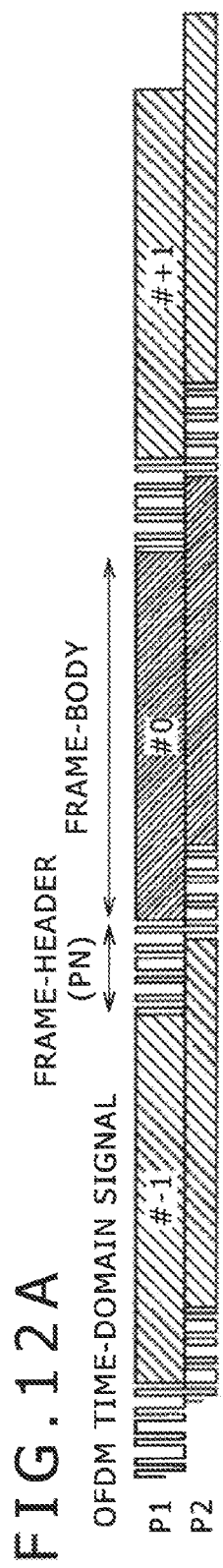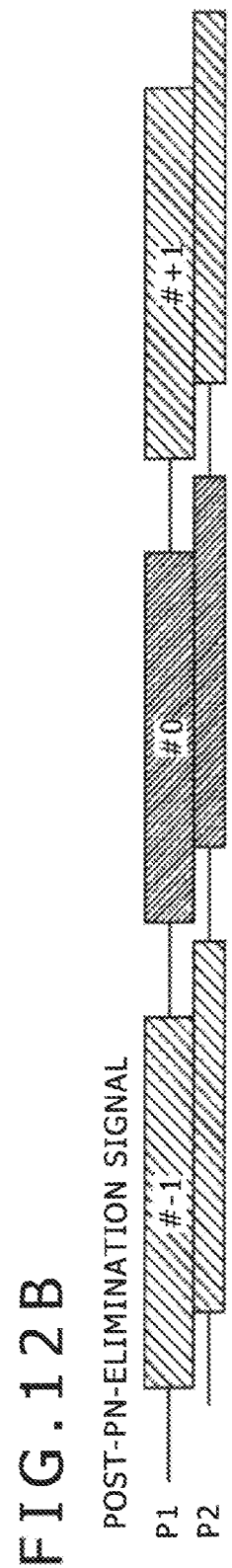

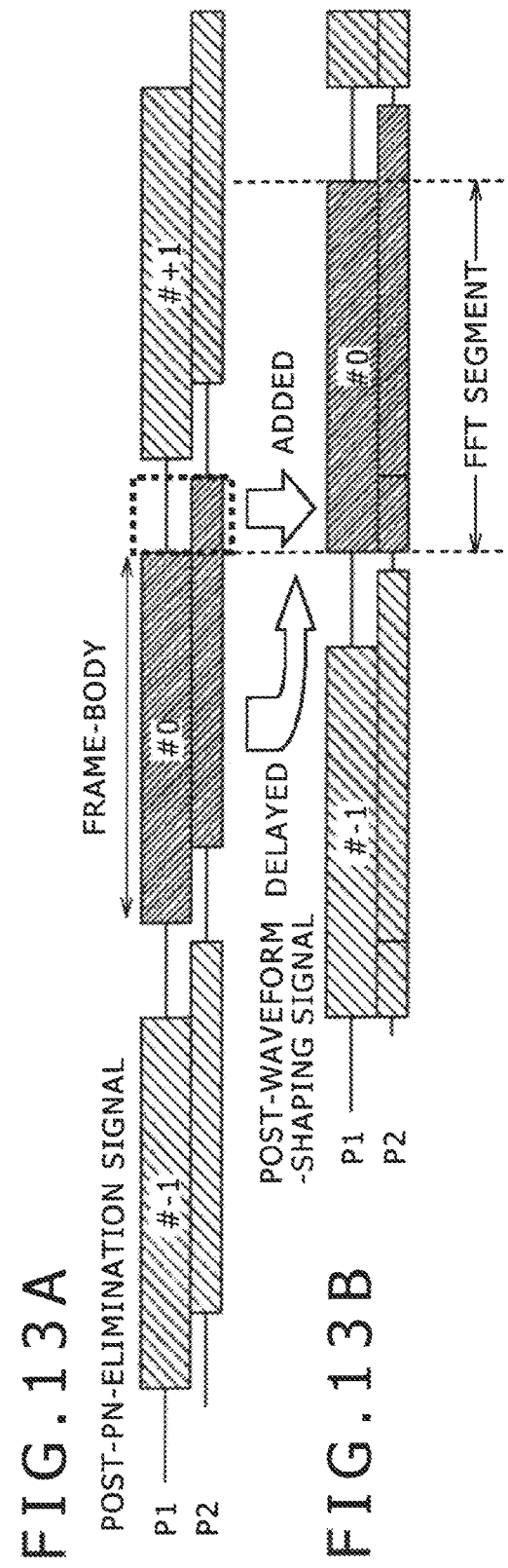

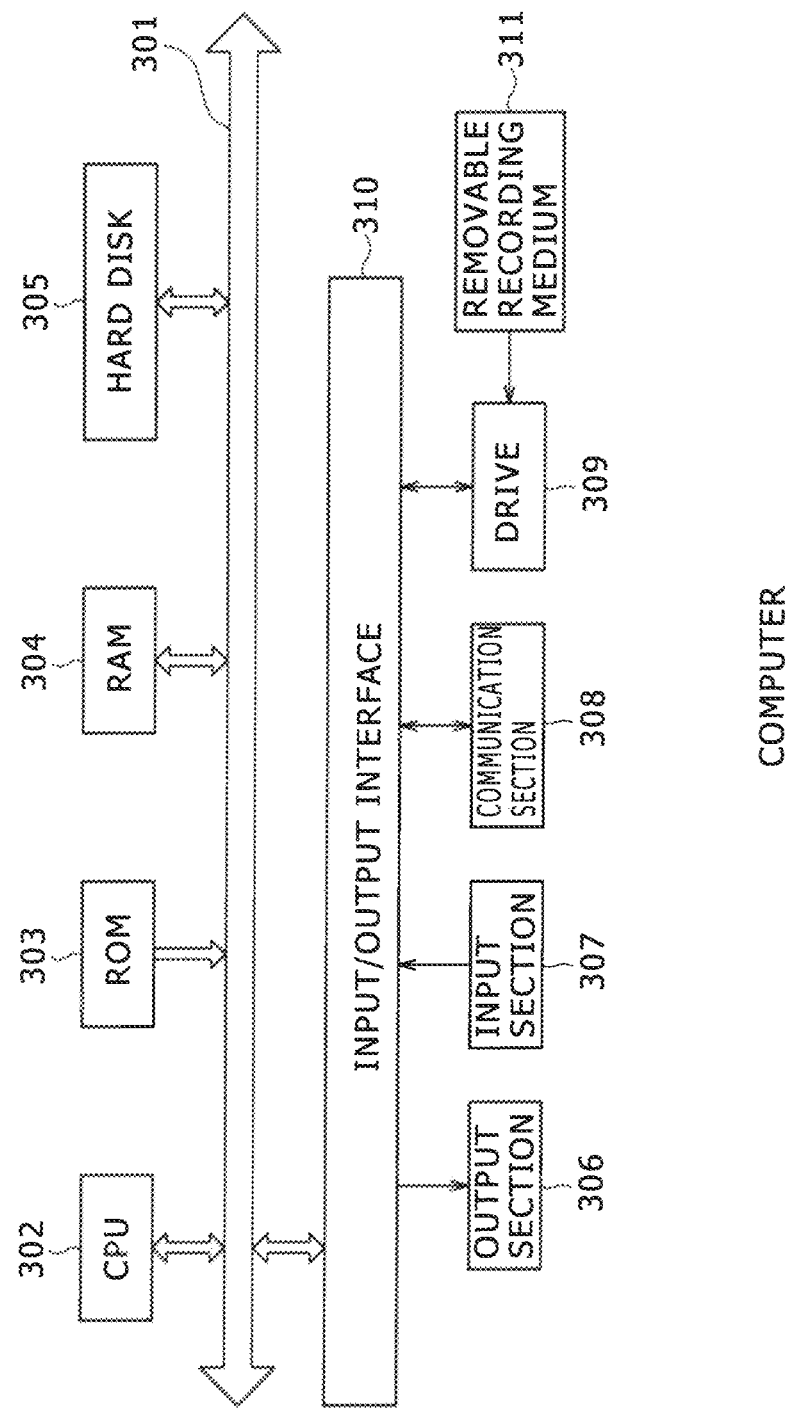

SIGNAL PROCESSING APPARATUS, SIGNAL PROCESSING METHOD AND PROGRAM

BACKGROUND

The present disclosure relates to a signal processing apparatus, a signal processing method and a program. More particularly, the present disclosure relates to a signal processing apparatus having a small size receiving apparatus to serve as an apparatus for receiving both single-carrier and multi-carrier signals and also relates to a signal processing method adopted by the signal processing apparatus as well as a program implementing the signal processing method.

In recent years, digital broadcasting conforming to a variety of standards has been started. Typical standards for the digital broadcasting include ISDB (Integrated Services Digital Broadcasting), DVB (Digital Video Broadcasting) and ATSC (Advanced Television Systems Committee) standards.

By the way, methods provided for the digital broadcasting are classified into two big categories, that is, a method for transmitting a single-carrier signal and a method for transmitting a multi-carrier signal.

In the DTMB (Digital Terrestrial Multimedia Broadcast), both single-carrier and multi-carrier signals are signals which are to be transmitted. Thus, a receiving apparatus for receiving digital broadcasts conforming to the DTMB standard is capable of receiving both single-carrier and multi-carrier signals. That is to say, such a receiving apparatus is required to be capable of processing both single-carrier and multi-carrier signals.

A receiving apparatus for receiving digital broadcasts carries out processing on the received signal. The processing typically includes an equalization process for equalizing the received signal in order to eliminate (reduce) effects of a transmission line such as a multi-path line from the received signal.

Since the substance of the equalization process for equalizing a single-carrier signal is different from the substance of the equalization process for equalizing a multi-carrier signal, a receiving apparatus for receiving both single-carrier and multi-carrier signals must be provided with a circuit for the equalization process for equalizing a single-carrier signal and a circuit for the equalization process for equalizing a multi-carrier signal.

The equalization process for equalizing a single-carrier signal is described in documents such as Non-patent Document 1 whereas the equalization process for equalizing a multi-carrier signal is described in documents such as Non-patent Documents 2 and 3. Non-patent Documents are listed below:

Non-Patent Document 1
Dazhi He, Weiqiang Liang, Wenjun Zhang, Ge Huang, Yunfeng Guan and Feng Hu, "Error rotated decision feedback equalizer for Chinese DTTB Receiver," 2008 IEEE International Symposium on Broadband Multimedia Systems and Broadcasting;

Non-Patent Document 2
Liu M, Crussiere M and Helard J. -F., "A Combined Time and Frequency Algorithm for Improved Channel Estimation in TDS-OFDM," 2010 IEEE International Conference on Communications (ICC);

Non-Patent Document 3
Zi-Wei Zheng, Zhi-Xing Yang, Chang-Yong Pan and Yi-Sheng Zhu, Senior Member, IEEE, "Novel Synchronization for TDS-OFDM-Based Digital Television Terrestrial Broadcast Systems," IEEE TRANSACTIONS ON BROADCASTING, VOL. 50, NO. 2, JUNE 2004.

SUMMARY

In the receiving apparatus for receiving both single-carrier and multi-carrier signals as described above, however, if the circuit for the equalization process for equalizing a single-carrier signal is provided separately from the circuit for the equalization process for equalizing a multi-carrier signal, the size of the receiving apparatus increases.

Addressing the circumstances described above, it is desirable to configure the receiving apparatus for receiving both single-carrier and multi-carrier signals into a small size.

A signal processing apparatus according to a mode of the present disclosure has a signal processing unit configured to carry out signal processing on single-carrier and multi-carrier signals by making use of a plurality of common filters shared by the single-carrier and multi-carrier signals. A program according to the mode of the present disclosure is a program to be executed by a computer in order to carry out functions of the signal processing apparatus.

A signal processing method according to the mode of the present disclosure is a signal processing method in accordance with which a signal processing unit carries out signal processing on single-carrier and multi-carrier signals by making use of a plurality of common filters shared by the single-carrier and multi-carrier signals.

As described above, in accordance with the mode of the present disclosure, signal processing is carried out on single-carrier and multi-carrier signals by making use of a plurality of common filters shared by the single-carrier and multi-carrier signals.

It is to be noted that the signal processing apparatus can be a stand-alone apparatus or internal blocks forming the apparatus.

The program can be presented to the user by transmitting the program through a transmission medium or recording the program on a recording medium which is then given to the user.

As described above, in accordance with the mode of the present disclosure, it is possible to reduce the size of a receiving apparatus for receiving both single-carrier and multi-carrier signals.

BRIEF DESCRIPTION OF THE DRAWINGS

FIGS. 12A and 12B are a plurality of explanatory diagrams to be referred to in description of processing carried out by a subtractor;

FIGS. 13A and 13B are a plurality of explanatory diagrams to be referred to in description of processing carried out by an OFDM waveform shaping section;

FIG. 18 is a block diagram showing a typical configuration of a computer according to an embodiment of the present disclosure.

DETAILED DESCRIPTION OF THE PREFERRED EMBODIMENT

[An Embodiment Implementing a Transmission System According to the Disclosure]

Figure 1:
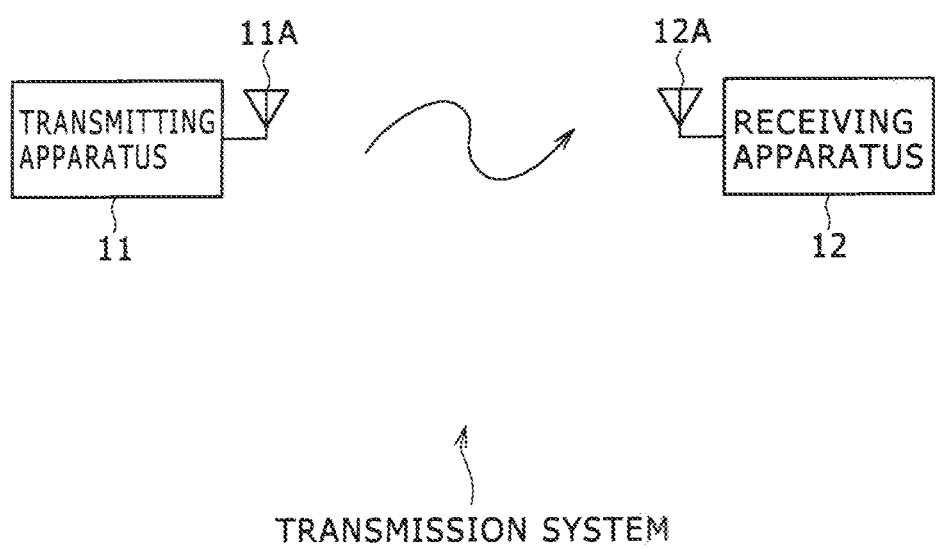
FIG. 1 is a block diagram showing a typical configuration of a transmission system according to an embodiment of the present disclosure.

FIG. 1 is a block diagram showing a typical configuration of a transmission system according to an embodiment of the present disclosure. The technical term 'system' used in this specification of the present disclosure implies a logical confluence including a plurality of apparatus without regard to whether or not the apparatus are included in a case.

As shown in FIG. 1, the transmission system is configured to include a transmitting apparatus 11 and a receiving apparatus 12.

The transmitting apparatus 11 transmits a television program as a digital broadcast conforming to typically the DTMB standard.

That is to say, the transmitting apparatus 11 converts the so-called real data into a single-carrier or multi-carrier signal by carrying out digital modulation on the data and transmits the signal through an antenna 11A by adoption of the radio-communication technique. Typical examples of the real data are television-program images and television-program sounds.

In order to make the following explanation simple, the transmission system shown in FIG. 1 includes only one transmitting apparatus 11 serving as an apparatus for transmitting digital broadcasts. It is to be noted, however, that the transmission system may include a plurality of transmitting apparatus each used for transmitting digital broadcasts.

In the case of a transmission system including a plurality of transmitting apparatus including the transmitting apparatus 11, typically, the broadcast company broadcasting television programs determines whether a signal to be transmitted by a transmitting apparatus is a single-carrier or multi-carrier signal for each of the transmitting apparatus.

The receiving apparatus 12 receives the single-carrier or multi-carrier signal from the transmitting apparatus 11 through an antenna 12A and demodulates the signal in order to generate the real data.

The receiving apparatus 12 is compatible with both the single-carrier and multi-carrier signals and, hence, capable of receiving and processing both the single-carrier and multi-carrier signals.

In addition, in order to make the following explanation simple, the transmission system shown in FIG. 1 includes only one receiving apparatus 12 serving as an apparatus for receiving digital broadcasts. It is to be noted, however, that the transmission system may include a plurality of receiving apparatus each used for receiving digital broadcasts.

[Typical Configuration of the Transmitting Apparatus 11]

Figure 2:
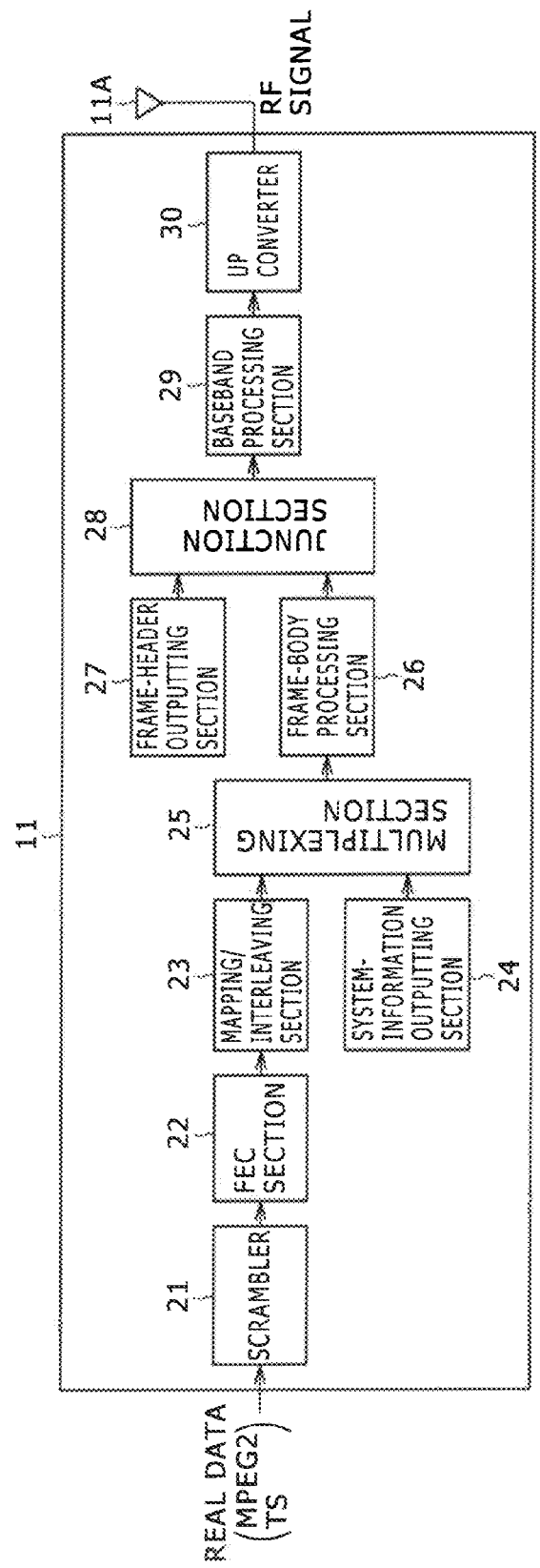
FIG. 2 is a block diagram showing a typical configuration of a transmitting apparatus employed in the transmission system shown in FIG. 1.

FIG. 2 is a block diagram showing a typical configuration of a transmitting apparatus 11 shown in FIG. 1.

As shown in FIG. 2, the transmitting apparatus 11 employs a scrambler 21, an FEC (Forward Error Correction) section 22, a mapping/interleaving section 23, a system-information outputting section 24, a multiplexing section 25, a frame-body processing section 26, a frame-header outputting section 27, a junction section 28, a baseband processing section 29 and an up converter 30.

The scrambler 21 receives transport stream packets as real data which is television-program images and television-program sounds. A typical example of the transport stream packet is an MPEG2 TS (Moving Picture Experts Group 2 Transport Stream) packet.

The scrambler 21 carries out scramble processing including an energy diffusion treatment on the real data supplied thereto and outputs resulting real data to the FEC section 22.

The FEC section 22 carries out error correction coding to code the real data received from the scrambler 21 into error-correction code and supplies the obtained error-correction code to the mapping/interleaving section 23.

The mapping/interleaving section 23 maps the error-correction code received from the FEC section 22 onto signal points on the IQ constellation in symbol units each consisting of bits, the number of which is a predetermined value equal to or greater than 1. The signal points are points determined by a predetermined digital modulation method such as the 4QAM (Quadrature Amplitude Modulation), 16QAM, 32QAM or 64QAM method.

In addition, the mapping/interleaving section 23 carries out a time interleaving process on the post-mapping symbols in order to interleave the symbols in the time-axis direction. The mapping/interleaving section 23 supplies a sequence of symbols to the multiplexing section 25. The sequence of symbols is a symbol string obtained by rearranging the sequence of post-mapping symbols in the time-axis direction in the time interleaving process.

The system-information outputting section 24 supplies a sequence of symbols of system information such as transmission parameters to the multiplexing section 25. The transmission parameters include a parameter representing the digital modulation method and carrier mode indicating that the RF (Radio Frequency) signal to be output by the up converter 30 is a single-carrier or multi-carrier signal.

The multiplexing section 25 multiplexes the symbols received from the mapping/interleaving section 23 with the symbols received from the system-information outputting section 24 in order to form a frame body and supplies the frame body to the frame-body processing section 26. As described above, the symbols received from the mapping/interleaving section 23 are the symbols of the real data whereas the symbols received from the system-information outputting section 24 are the symbols of the system information. Besides, the frame-body is a confluence of a predetermined number of symbols.

The frame-body processing section 26 carries out necessary frame-body processing on the frame body received from the multiplexing section 25 and supplies the result of the processing to the junction section 28.

The frame-header outputting section 27 generates a PN group determined in advance and supplies a symbol sequence of the PN group to the junction section 28 as a frame header.

The junction section 28 integrates the frame header received from the frame-header outputting section 27 and the frame body received from the frame-body processing section 26 in order to construct a frame conforming to typically the DTMB standard and supplies the frame to the baseband processing section 29.

The baseband processing section 29 handles the frame received from the junction section 28 as a baseband signal and carries out necessary processing on the baseband signal. The baseband processing section 29 then supplies the result of the processing to the up converter 30.

The up converter 30 converts the frame received from the baseband processing section 29 as the baseband signal into the RF signal by changing the frequency of the baseband signal to a radio frequency and transmits the RF signal by way of the antenna 11A by adoption of the radio communication technique.

[Typical Configuration of the Transmitting Apparatus 11 for Transmitting Single-Carrier Signals]

Figure 3:
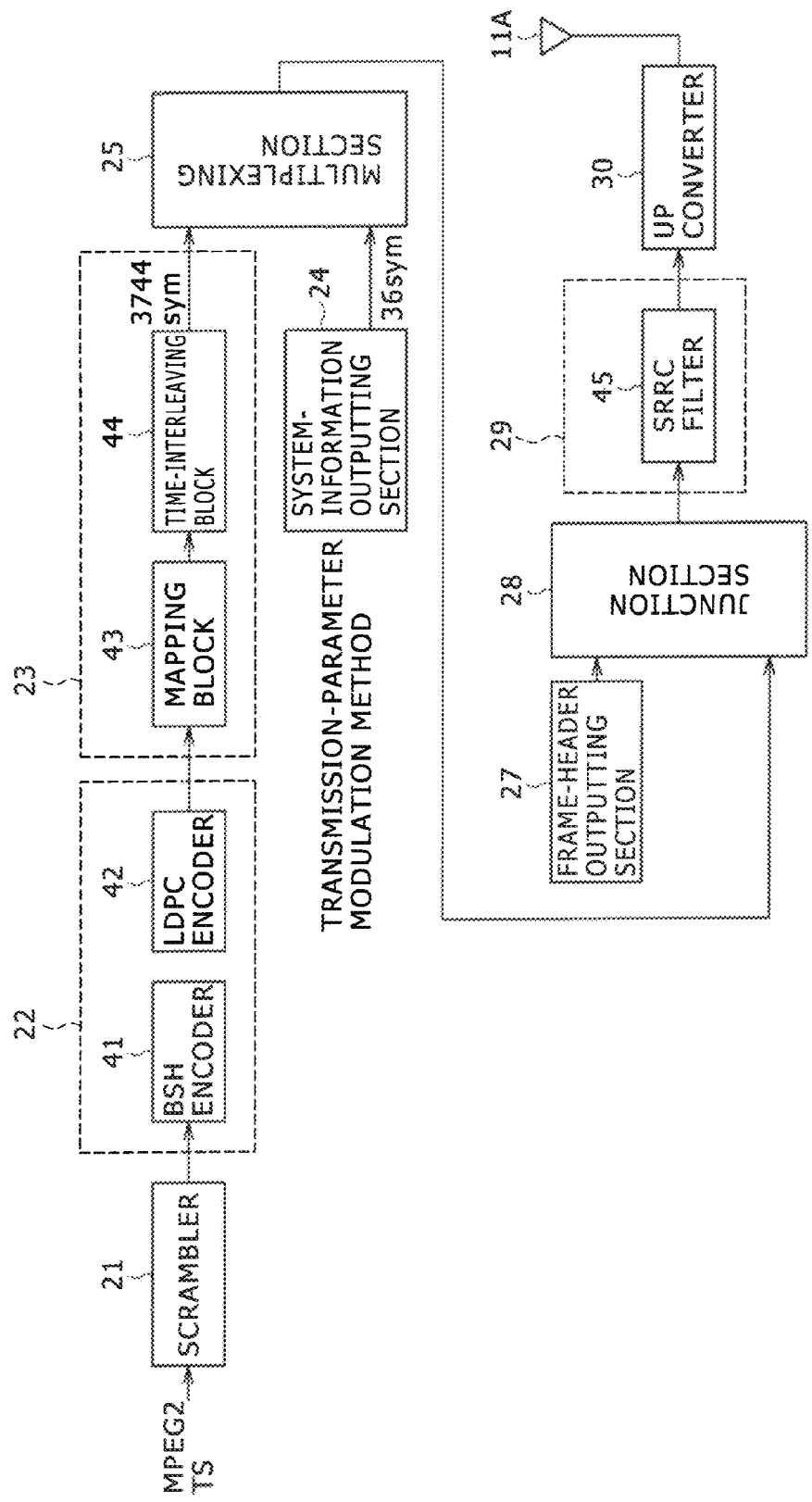
FIG. 3 is an explanatory diagram to be referred to in description of processing carried out by the transmitting apparatus to transmit a single-carrier signal.

FIG. 3 is an explanatory diagram referred to in the following description of processing carried out by the transmitting apparatus 11 shown in FIG. 2 to transmit a single-carrier signal.

That is to say, FIG. 3 is an explanatory diagram showing a typical functional configuration of the transmitting apparatus 11 shown in FIG. 2 as an apparatus for transmitting a single-carrier signal.

It is to be noted that, in FIG. 3, elements identical with their respective counterparts shown in FIG. 2 are denoted by the same reference numerals and the explanation of the identical elements is not repeated.

In FIG. 3, the FEC section 22 is configured to have a BCH (Bose-Chaudhury-Hocquenghem) encoder 41 and an LDPC (Low Density Parity Check) encoder 42.

In addition, in FIG. 3, the mapping/interleaving section 23 is configured to have a mapping block 43 and a time-interleaving block 44.

On top of that, in FIG. 3, the baseband processing section 29 is configured to have an SRRC (Square Root Raised Cosine) filter 45.

It is to be noted that, in FIG. 3, the frame-body processing section 26 is not included. This is because, in a transmission of a single-carrier signal, the frame-body processing section 26 is not required. That is to say, the figure shows that a frame body generated by the multiplexing section 25 is supplied directly to the junction section 28, bypassing the frame-body processing section 26.

In FIG. 3, the scrambler 21 carries out scramble processing including the energy diffusion treatment on real data supplied thereto and outputs resulting real data to the BCH encoder 41 employed in the FEC section 22.

The BCH encoder 41 codes the real data received from the scrambler 21 into BCH code and supplies the BCH code to the LDPC encoder 42.

The LDPC encoder 42 codes the BCH code received from the BCH encoder 41 into LDPC code and supplies the LDPC code to the mapping block 43 employed in the mapping/interleaving section 23.

The mapping block 43 maps the LDPC code received from the LDPC encoder 42 onto signal points on the IQ constellation in symbol units and supplies resulting symbols to the time-interleaving block 44.

The time-interleaving block 44 carries out a time interleaving process on the post-mapping symbols received from the mapping block 43 to generate a sequence of symbols and supplies the sequence of symbols to the multiplexing section 25. The sequence of symbols is a symbol string obtained by rearranging the sequence of post-mapping symbols in the time-axis direction in the time interleaving process.

The multiplexing section 25 multiplexes the symbols received from the time-interleaving block 44 employed in the mapping/interleaving section 23 with symbols received from the system-information outputting section 24 in order to form a frame body and supplies the frame body to the junction section 28. As described above, the symbols received from the mapping/interleaving section 23 are the symbols of the real data whereas the symbols received from the system-information outputting section 24 are the symbols of system information.

That is to say, the system-information outputting section 24 supplies the system-information symbols to be multiplexed into a frame to the multiplexing section 25. For example, the system-information outputting section 24 supplies 36 system-information symbols (36 sym) to the multiplexing section 25.

The multiplexing section 25 multiplexes the 3,744 real-data symbols received from the time-interleaving block 44 with the 36 system-information symbols received from the system-information outputting section 24 in order to generate a frame body composed of (3,744+36) symbols and supplies the frame body to the junction section 28.

The junction section 28 integrates a frame header received from the frame-header outputting section 27 as described below with (3,744+36) symbols received from the multiplexing section 25 as the frame body in order to construct a frame and supplies the frame to the baseband processing section 29.

The frame-header outputting section 27 supplies typically 420 symbols of a PN group determined in advance to the junction section 28 as the frame header.

That is to say, the junction section 28 integrates the 420 symbols received from the frame-header outputting section 27 as the frame header with the (3,744+36) symbols received from the multiplexing section 25 as the frame body in order to construct a frame and supplies the frame to the SRRC filter 45 employed in the baseband processing section 29.

The SRRC filter 45 handles the frame received from the junction section 28 as a baseband signal and carries out baseband processing of performing filtering on the frame in order to shape the waveform of the baseband signal. The SRRC filter 45 then supplies the result of the waveform shaping to the up converter 30.

The up converter 30 converts the frame received from the baseband processing section 29 as the baseband signal into an RF signal serving as a single-carrier signal by changing the frequency of the baseband signal to a radio frequency and transmits the RF signal by way of the antenna 11A by adoption of the radio communication technique.

Figure 4:
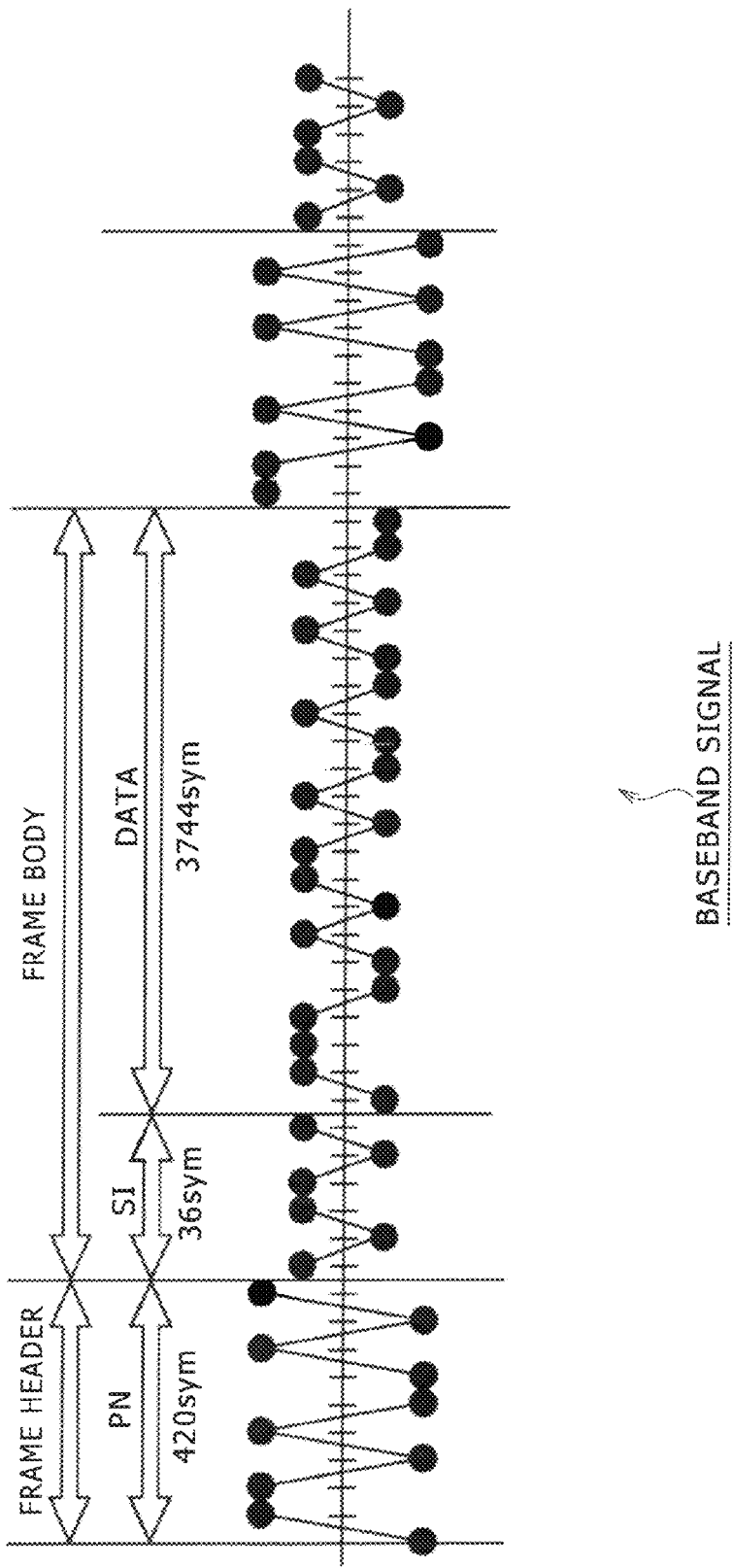
FIG. 4 is a diagram showing a typical configuration of a frame serving as a baseband signal of a single-carrier signal.

FIG. 4 is a diagram showing a typical configuration of a frame serving as a baseband signal of a single-carrier signal.

As shown in the figure, a frame serving as a baseband signal of a single-carrier signal is configured to include the 420 PN-group symbols (420 sym) serving as a frame header and the (3,744+36) symbols serving as a frame body.

As described above, the frame body consists of 36 symbols of SI (System Information) and 3,744 symbols of real data.

[Typical Configuration of the Transmitting Apparatus 11 for Transmitting Multi-Carrier Signals]

Figure 5:
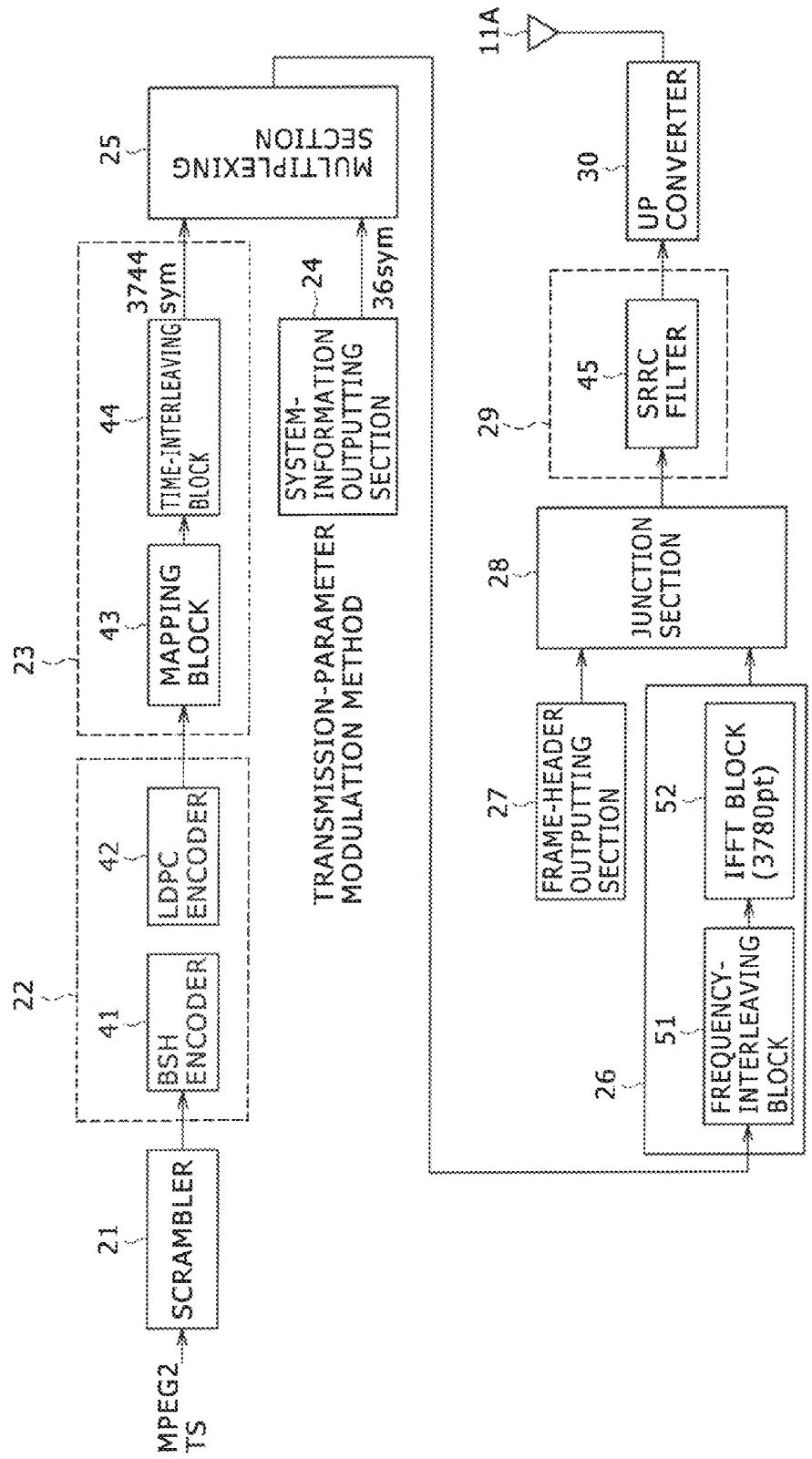
FIG. 5 is an explanatory diagram to be referred to in description of processing carried out by the transmitting apparatus to transmit a multi-carrier signal.

FIG. 5 is an explanatory diagram referred to in the following description of processing carried out by the transmitting apparatus 11 shown in FIG. 2 to transmit a multi-carrier signal.

That is to say, FIG. 5 is an explanatory diagram showing a typical functional configuration of the transmitting apparatus 11 shown in FIG. 2 as an apparatus for transmitting a multi-carrier signal.

It is to be noted that, in FIG. 5, elements identical with their respective counterparts shown in FIGS. 2 and 3 are denoted by the same reference numerals and the explanation of the identical elements is not repeated.

In FIG. 5, as well as in FIG. 3, the FEC section 22 is configured to have a BCH encoder 41 and an LDPC encoder 42; the mapping/interleaving section 23 is configured to have a mapping block 43 and a time-interleaving block 44; the baseband processing section 29 is configured to have an SRRC filter 45.

In FIG. 5, however, unlike the configuration shown in FIG. 3, the frame-body processing section 26 does function. As shown in FIG. 5, the frame-body processing section 26 is configured to include a frequency-interleaving block 51 and an IFFT (Inverse FFT (Fast Fourier Transform)) block 52.

In addition, the transmitting apparatus 11 shown in FIG. 5 typically transmits an OFDM (Orthogonal Frequency Division Multiplexing) signal as a multi-carrier signal.

That is to say, in the typical functional configuration shown in FIG. 5, sections ranging from the scrambler 21 to the multiplexing section 25 carry out the same processing as the typical functional configuration shown in FIG. 3. Thus, the multiplexing section 25 supplies a frame body composed of 3,780 (=3,744+36) symbols to the frequency-interleaving block 51 employed in the frame-body processing section 26. The (3,744+36) symbols consist of 3,744 real-data symbols and 36 system-information symbols.

The frequency-interleaving block 51 carries out frequency interleaving to interleave the symbols composing the frame body in the frequency direction which is the direction of a sub-carrier of the OFDM signal. By carrying out the frequency interleaving, the frequency-interleaving block 51 generates a frame body composed of 3,780 symbols, the sequence of which has been rearranged in the frequency direction. Then, the frequency-interleaving block 51 supplies the generated frame body to the IFFT block 52.

The IFFT block 52 carries out 3780-point (3780 pt) IFFT processing on a frame body generated by the frequency-interleaving block 51 as the frame body composed of 3,780 symbols and supplies the result of the processing to the junction section 28.

That is to say, the IFFT block 52 treats the frame body, which has been received from the frequency-interleaving block 51 as the frame body composed of 3,780 symbols, as a frequency-domain signal and carries out the IFFT processing on the signal. The IFFT block 52 then provides the junction section 28 with a frame body represented by a time-domain OFDM signal obtained as a result of the IFFT processing.

The junction section 28 joins a frame header received from the frame-header outputting section 27 with the frame body received from the IFFT block 52 employed in the frame-body processing section 26 in order to construct a frame. The frame header is composed of 420 symbols whereas the frame body is composed of 3,780 symbols obtained as a result of the IFFT processing. Then, the junction section 28 supplies the generated frame to the SRRC filter 45 employed in the baseband processing section 29.

The SRRC filter 45 handles the frame received from the junction section 28 as a baseband signal and carries out baseband processing for performing filtering on the frame in order to shape the waveform of the baseband signal. The SRRC filter 45 then supplies the result of the waveform shaping to the up converter 30.

The up converter 30 converts the frame received from the baseband processing section 29 as the baseband signal into an RF signal serving as a multi-carrier signal by changing the frequency of the baseband signal to a radio frequency and transmits the RF signal to the receiving apparatus 12 by way of the antenna 11A by adoption of the radio communication technique.

Figure 6:
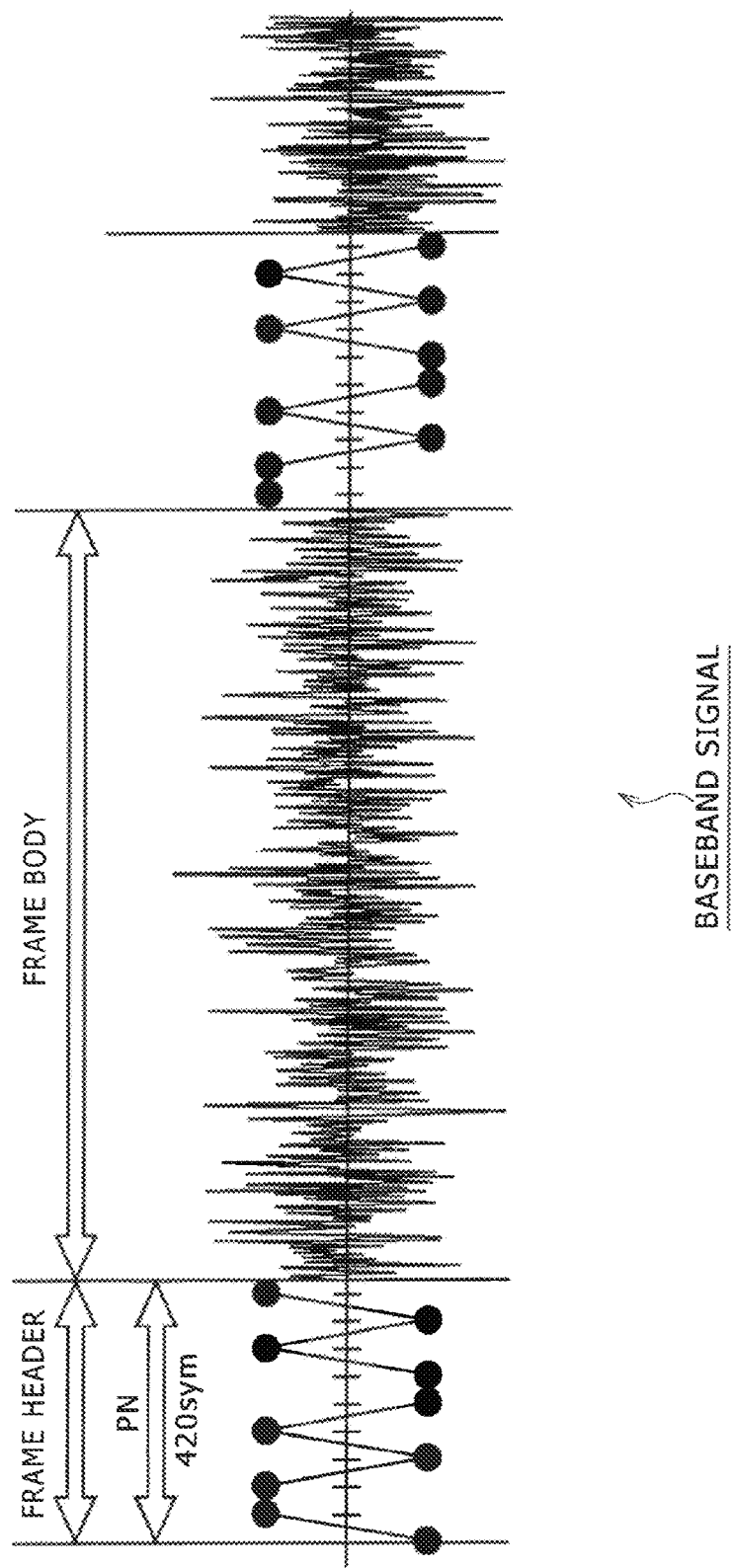
FIG. 6 is a diagram showing a typical configuration of a frame serving as a baseband signal of a multi-carrier signal.

FIG. 6 is a diagram showing a typical configuration of a frame serving as a baseband signal of a multi-carrier signal.

As shown in the figure, a frame serving as a baseband signal of a multi-carrier signal is configured to include the 420 PN group symbols serving as a frame header and the 3,780 real-data symbols of system information serving as a frame body obtained as a result of the IFFT processing.

[Frequency Characteristic of the SRRC Filter 45]

Figure 7:
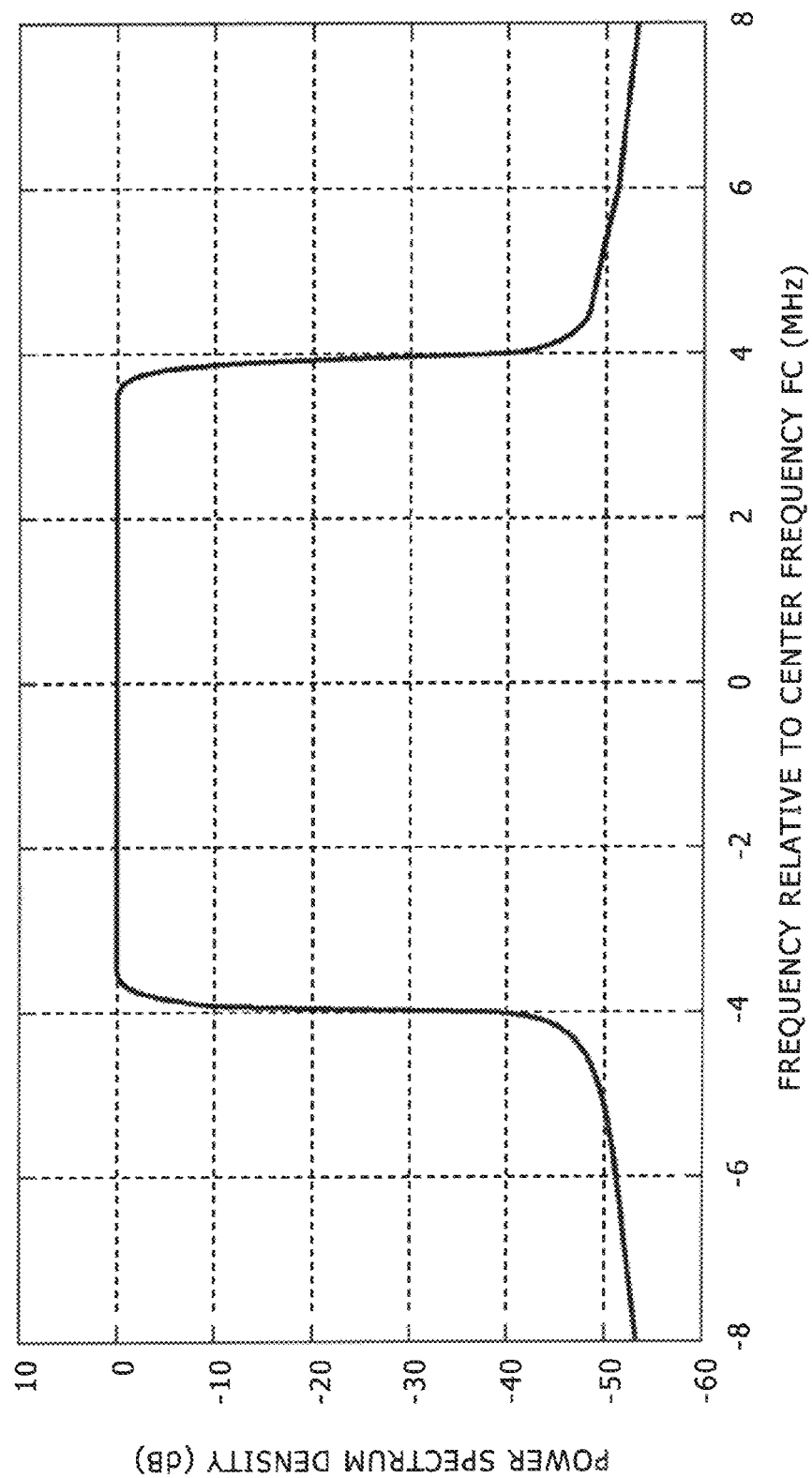
FIG. 7 is a diagram showing a typical frequency characteristic of an SRRC filter.

FIG. 7 is a diagram showing a typical frequency characteristic H (f) of the SRRC filter 45 shown in FIGS. 3 and 5.

The frequency characteristic H (f) of the SRRC filter 45 is expressed by typically Equation (1) given as follows.

$$H(f) = \begin{cases} 1 & |f| \leq f_N(1-\alpha) \\ \{\frac{1}{2} + \frac{1}{2}\cos\frac{\pi}{\alpha f_N}\left(\frac{|f|-f_N(1-\alpha)}{2}\right)\}^{\frac{1}{2}} & f_N(1-\alpha) < |f| \leq f_N(1+\alpha) \\ 0 & |f| > f_N(1+\alpha) \end{cases} \quad (1)$$

In Equation (1), reference notation f denotes the frequency whereas reference notations $f_N$ and $\alpha$ each denote a constant determined in advance.

FIG. 7 shows a frequency characteristic for $f_N$=(7.56/2) MHz and $\alpha$=0.05.

[Typical Configuration of the Receiving Apparatus 12]

Figure 8:
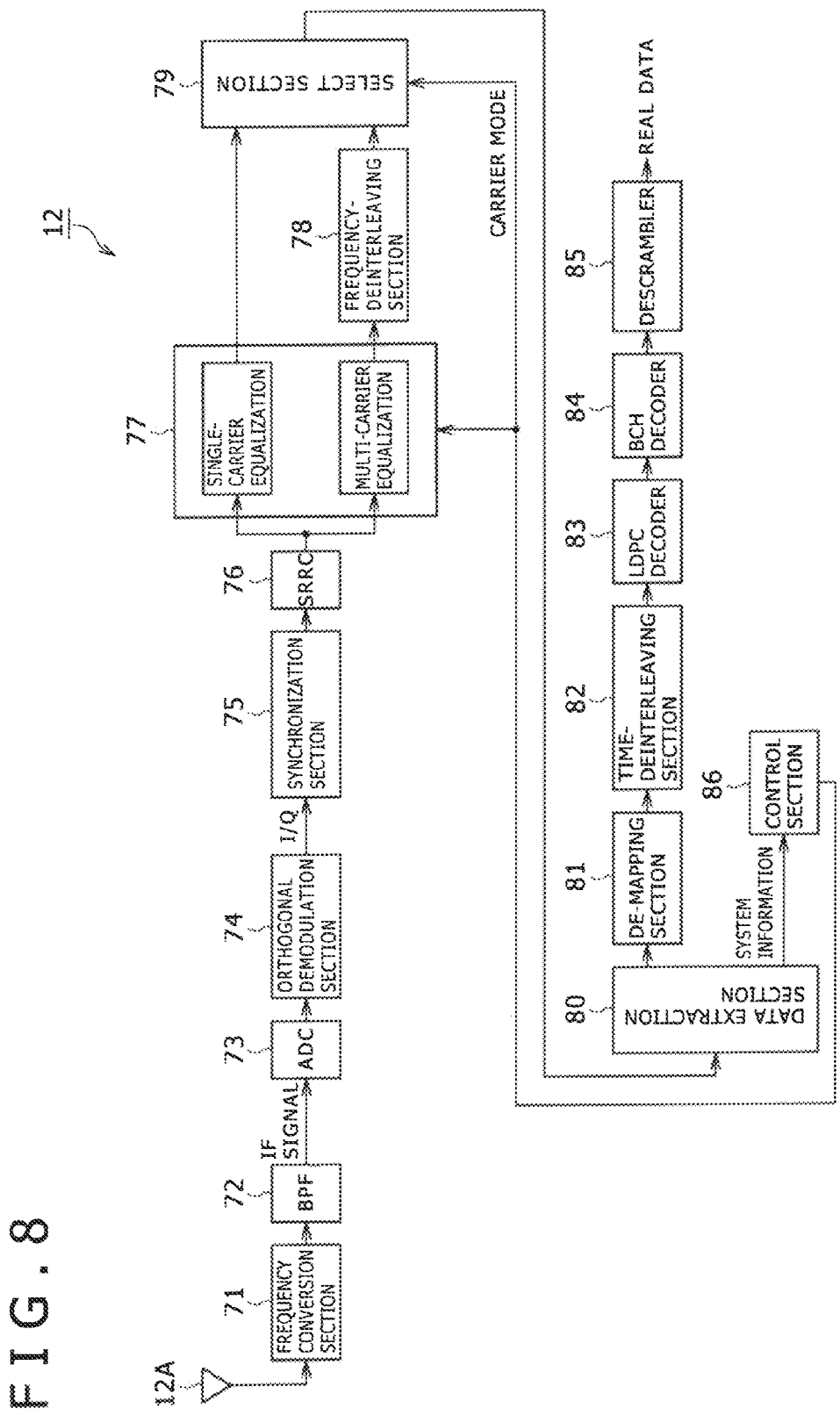
FIG. 8 is a block diagram showing a typical configuration of a receiving apparatus employed in the transmission system shown in FIG. 1.

FIG. 8 is a block diagram showing a typical configuration of the receiving apparatus 12 employed in the transmission system shown in FIG. 1.

As shown in FIG. 8, the receiving apparatus 12 employs a frequency conversion section 71, a BPF (Band Pass Filter) 72, an ADC (Analog Digital Converter) 73, an orthogonal demodulation section 74, a synchronization section 75, an SRRC filter 76, an equalization section 77, a frequency-deinterleaving section 78, a select section 79, a data extraction section 80, a de-mapping section 81, a time-deinterleaving section 82, an LDPC decoder 83, a BCH decoder 84, a descrambler 85 and a control section 86.

The frequency conversion section 71 obtains from the antenna 12A an RF signal which transmitted from the transmitting apparatus 11.

The frequency conversion section 71 converts the RF signal into an IF (Intermediate Frequency) signal by changing the frequency of the RF signal and supplies the IF signal to the BPF 72.

The BPF 72 carries out filtering on the IF signal received from the frequency conversion section 71 in order to extract an IF signal having a desired frequency band (or a channel frequency) and supplies the IF signal to the ADC 73.

The ADC 73 carries out A/D (Analog to Digital) conversion on the IF signal received from the BPF 72 in order to convert the IF signal into a digital signal and supplies the digital signal to the orthogonal demodulation section 74.

The orthogonal demodulation section 74 carries out orthogonal demodulation on the digital IF signal received from the ADC 73 in order to generate an IQ signal and supplies the IQ signal to the synchronization section 75. The IQ signal is a complex signal represented by a complex number as a signal including a real-axis component referred to as an I (In phase) component and an imaginary-axis component referred to as a Q (Quadrature phase) component.

The synchronization section 75 passes on the IQ signal received from the orthogonal demodulation section 74 to the SRRC filter 76. In addition, the synchronization section 75 also carries out synchronization processing in order to establish synchronization by making use of data including correlations among PN groups each serving as the frame header of a frame included in the IQ signal.

The synchronization processing includes sample-timing synchronization and carrier synchronization. The sample-timing synchronization is adjustment of timings to sample the IF signal subjected to the A/D conversion carried out by the ADC 73. The carrier synchronization is adjustment of the frequencies of carriers used in the orthogonal demodulation carried out by the orthogonal demodulation section 74.

The SRRC filter 76 has the same frequency characteristic as that of the SRRC filter 45 employed in the configurations shown in FIGS. 3 and 5. The SRRC filter 76 carries out filtering on the IQ signal received from the synchronization section 75 in order to shape the waveform of the IQ signal. The SRRC filter 76 then supplies a resulting IQ signal to the equalization section 77.

In accordance with carrier mode supplied by the control section 86, the equalization section 77 carries out equalization processing in order to equalize the IQ signal received from the SRRC filter 76. By carrying out the equalization processing, the equalization section 77 is capable of eliminating (reducing) effects of a transmission line such as a multi-path line from the IQ signal.

To put it in detail, the control section 86 provides the equalization section 77 with the carrier mode indicating that the IQ signal received from the SRRC filter 76 is a single-carrier or multi-carrier signal.

Carrier mode indicating that the IQ signal is a single-carrier signal is also referred to as single mode. On the other hand, carrier mode indicating that the IQ signal is a multi-carrier signal is also referred to as multi mode.

If the carrier mode received from the control section 86 is single mode, the equalization section 77 carries out single-carrier equalization processing as signal processing on a single-carrier signal which is an IQ signal received from the SRRC filter 76 and supplies (or outputs) an resulting IQ signal to the select section 79. The single-carrier equalization processing is equalization processing to be carried out on a single-carrier signal.

If the carrier mode received from the control section 86 is multi mode indicating that the carrier mode is a multi-carrier mode, on the other hand, the equalization section 77 carries out multi-carrier equalization processing as signal processing on a multi-carrier signal which is an IQ signal received from the SRRC filter 76 and supplies (or outputs) an resulting IQ signal to the frequency-deinterleaving section 78. The multi-carrier equalization processing is equalization processing to be carried out on a multi-carrier signal.

It is to be noted that, as will be described later in detail, the equalization section 77 has a plurality of filters such as typically two variable-coefficient filters each having variable tap coefficients each serving as a filter coefficient. The filters such as the two variable-coefficient filters are common filters shared by the single-carrier equalization processing and the multi-carrier equalization processing.

The frequency-deinterleaving section 78 carries out frequency deinterleaving on the multi-carrier signal which is an IQ signal received from the equalization section 77 in order to restore the sequence of signal symbols rearranged in the frequency interleaving carried out by the frequency-interleaving block 51 shown in FIG. 5 to the original sequence and supplies (or outputs) an resulting IQ signal to the select section 79.

In accordance with the carrier mode received from the control section 86, the select section 79 selects the IQ signal received from the equalization section 77 or the frequency-deinterleaving section 78 and supplies the selected IQ signal to the data extraction section 80.

To put it in detail, if the carrier mode indicates a single-carrier mode, the equalization section 77 must have supplied a single-carrier signal obtained as a result of the single-carrier equalization processing to the select section 79 as described above. Thus, in this case, the select section 79 selects the single-carrier signal received from the equalization section 77, outputting the single-carrier signal to the data extraction section 80.

If the carrier mode indicates a multi-carrier mode, on the other hand, the frequency-deinterleaving section 78 must have supplied a multi-carrier signal obtained as a result of the frequency de-interleaving to the select section 79 as described above. Thus, in this case, the select section 79 selects the multi-carrier signal received from the frequency-deinterleaving section 78, outputting the multi-carrier signal to the data extraction section 80.

The data extraction section 80 extracts (or separates) symbols of the real data and symbols of the system information from the frame body of the frame of the single-carrier or multi-carrier signal received from the select section 79.

Then, the data extraction section 80 supplies the symbols of the real data to the de-mapping section 81 and the symbols of the system information to the control section 86.

The de-mapping section 81 carries out de-mapping on the real-data symbols received from the data extraction section 80 and supplies resulting symbols to the time deinterleaving section 82.

The time deinterleaving section 82 carries out time deinterleaving on the symbols received from the de-mapping section 81 in order to restore the sequence of the symbols rearranged in the time interleaving carried out by the time-interleaving block 44 shown in FIG. 3 or 5 to the original sequence and supplies resulting symbols to the LDPC decoder 83.

The LDPC decoder 83 decodes LDPC code composed of bits composing the symbols received from the time deinterleaving section 82 in order to generate BCH code and supplies the BCH code to the BCH decoder 84.

The BCH decoder 84 decodes the BCH code received from the LDPC decoder 83 in order to generate the real data and supplies the real data to the descrambler 85.

The descrambler 85 carries out descramble processing such as an energy inverse diffusion treatment on the real data supplied thereto by the BCH decoder 84 and outputs resulting real data to an MPEG decoder not shown in the figure.

The control section 86 controls the sections composing the receiving apparatus 12 in accordance with the system-information symbols received from the data extraction section 80.

To put it in detail, the control section 86 typically recognizes the carrier mode of the IQ signal, which is supplied by the SRRC filter 76 to the equalization section 77, from the system-information symbols received from the data extraction section 80. Then, the control section 86 supplies carrier mode to the equalization section 77 and the select section 79 in order to control the equalization section 77 and the select section 79.

It is to be noted that the control section 86 is also capable of recognizing the carrier mode of the IQ signal, which is supplied by the SRRC filter 76 to the equalization section 77, from an information source other than the system-information symbols.

To put it in detail, for example, the equalization section 77 carries out both the single-carrier equalization processing and the multi-carrier equalization processing on the IQ signal received from the SRRC filter 76. Then, for the IQ signals obtained as results of the single-carrier equalization processing and the multi-carrier equalization processing, the control section 86 verify the normalcy states of their respective decoding results.

If the control section 86 verifies that the respective decoding results are normal for the IQ signal obtained as a result of the single-carrier equalization processing, the control section 86 determines that the carrier mode of the IQ signal supplied by the SRRC filter 76 to the equalization section 77 is the single-carrier mode.

If the control section 86 verifies that the respective decoding results are normal for the IQ signal obtained as a result of the multi-carrier equalization processing, on the other hand, the control section 86 determines that the carrier mode of the IQ signal supplied by the SRRC filter 76 to the equalization section 77 is the multi-carrier mode.

In either case, the control section 86 verifies that their respective decoding results are normal if the LDPC decoder 83 is capable of carrying out error correction on the LDPC code received from the time-deinterleaving section 82 whereas and the BCH decoder 84 is capable of carrying out error correction on the BCH code received from the LDPC decoder 83.

Next, before explaining the single-carrier equalization processing and the multi-carrier equalization processing which are carried out by the equalization section 77 by making use of two variable-coefficient filters as common filters shared by the single-carrier equalization processing and the multi-carrier equalization processing, the following description explains a single-carrier equalizer for carrying out the single-carrier equalization processing by itself and a multi-carrier equalizer for carrying out the multi-carrier equalization processing by itself.

[Equalizer for Carrying Out Single-Carrier Equalization Processing by Itself]

Figure 9:
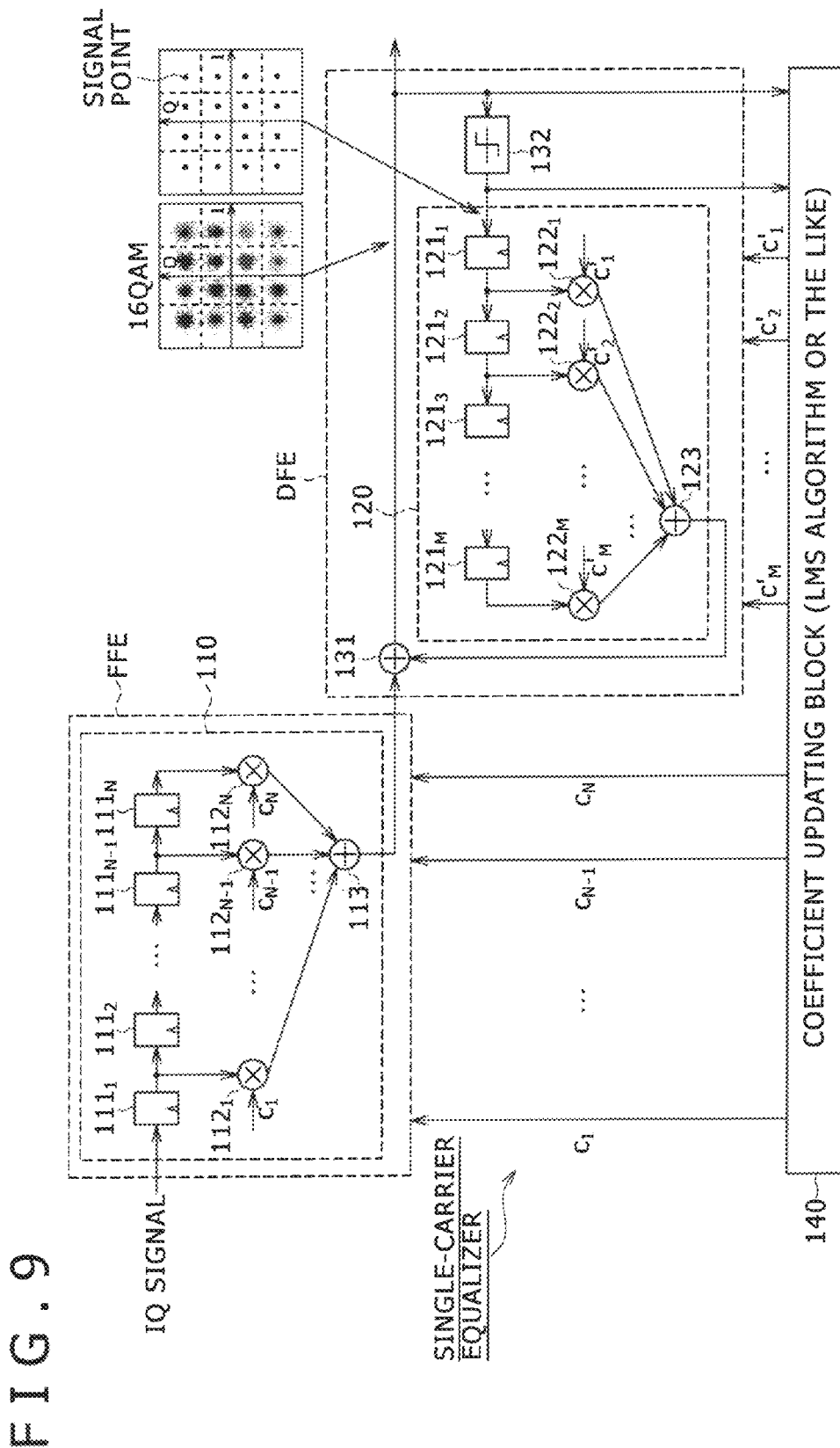
FIG. 9 is a block diagram showing a typical configuration of a single-carrier equalizer serving as an equalizer for carrying out single-carrier equalization processing by itself.

FIG. 9 is a block diagram showing a typical configuration of a single-carrier equalizer serving as an equalizer for carrying out single-carrier equalization processing by itself.

As shown in FIG. 9, the single-carrier equalizer employs variable-coefficient filters 110 and 120, an adder 131, a determiner 132 and a coefficient updating block 140.

Each of the variable-coefficient filters 110 and 120 is a digital filter having a plurality of variable tap coefficients each serving as one of the coefficients of the filter. Each of the variable-coefficient filters 110 and 120 carries out product-sum operations on input data supplied to the filter and the tap coefficients in order to produce a product-sum operation result and outputs the product-sum operation result as a result of digital filtering carried out on the input data.

The variable-coefficient filter 110 is an FIR (Finite Impulse Response) filter which is a filter having a plurality of taps, the number of which is N. The variable-coefficient filter 110 is configured to include N latch circuits $111_1$, $111_2$, ... and $111_N$, N multipliers $112_1$, $112_2$, ... and $112_N$ as well as an adder 113. Typically, each of the N latch circuits $111_1$, $111_2$, ... and $111_N$ is a flip-flop.

The N latch circuits $111_1$, $111_2$, ... and $111_N$ are connected to each other in series. In this series connection, the latch circuit $111_n$ receives data latched in the latch circuit $111_{n-1}$ provided at a stage immediately preceding the stage of the latch circuit $111_n$ where n=1, 2, ... and N.

That is to say, the latch circuit $111_n$ latches data held in the latch circuit $111_{n-1}$ provided at a stage immediately preceding the stage of the latch circuit $111_n$, supplying the data latched therein to the latch circuit $111_{n+1}$ and the multiplier $112_n$ which are provided at a stage immediately succeeding the stage of the latch circuit $111_n$.

It is to be noted that the first latch circuit $111_1$ of the variable-coefficient filter 110 receives a single-carrier signal which is an IQ signal serving as an object of the single-carrier equalization processing.

The multiplier $112_n$ receives data latched in the latch circuit $111_n$ and a tap coefficient $c_n$ from the coefficient updating block 140.

The multiplier $112_n$ multiplies the data latched in the latch circuit $111_n$ by the tap coefficient $c_n$ received from the coefficient updating block 140 and outputs a product obtained as the result of the multiplication to the adder 113.

The adder 113 carries out an operation to sum up such products received from the N multipliers $112_1$, $112_2$, ... and $112_N$ in order to produce the sum of the products as a result of the summing-up operation.

In the single-carrier equalizer shown in FIG. 9, the variable-coefficient filter 110 forms an FFE (Feed Forward Equalizer) whereas the sum produced by the adder 113 is supplied to the adder 131 as the output of the FFE.

By the same token, the variable-coefficient filter 120 is a FIR filter having a plurality of taps, the number of which is M. The variable-coefficient filter 120 is configured to include M latch circuits $121_1$, $121_2$, ... and $121_M$, M multipliers $122_1$, $122_2$, ... and $122_M$ as well as an adder 123.

The M latch circuits $121_1$, $121_2$, ... and $121_M$ are connected to each other in series. In this series connection, the latch circuit $121_m$ receives data latched in the latch circuit $121_{m-1}$ provided at a stage immediately preceding the stage of the latch circuit $121_m$ where m=1, 2, ... and M.

That is to say, the latch circuit $121_m$ latches data held in a latch circuit $121_{m-1}$ provided at a stage immediately preceding the stage of the latch circuit $121_m$, supplying the data latched therein to the latch circuit $121_{m+1}$ and the multiplier $122_m$ which are provided at a stage immediately succeeding the stage of the latch circuit $121_m$.

It is to be noted that the first latch circuit $121_1$ of the variable-coefficient filter 120 receives a hard-determination result output by the determiner 132.

The multiplier $122_m$ receives data latched in the latch circuit $121_m$ and a tap coefficient $c_m'$ from the coefficient updating block 140.

The multiplier $122_m$ multiplies the data latched in the latch circuit $121_m$ by the tap coefficient $c_m'$ received from the coefficient updating block 140 and outputs a product obtained as the result of the multiplication to the adder 123.

The adder 123 carries out an operation to sum up such products received from the M multipliers $122_1$, $122_2$, ... and $122_M$ in order to produce the sum of the products as a result of the summing-up operation.

The sum produced by the adder 123 is supplied to the adder 131.

The adder 131 adds the sum received from the adder 113 employed in the variable-coefficient filter 110 composing the FFE to the sum received from the adder 123 employed in the variable-coefficient filter 120 in order to produce a grand sum and outputs the grand sum as a result of the equalization processing carried out on the single-carrier signal supplied to the variable-coefficient filter 110.

In addition, the adder 131 outputs the grand sum of the sum received from the adder 113 and the sum received from the adder 123 to the determiner 132 and the coefficient updating block 140.

The determiner 132 carries out hard determination on the grand sum received from the adder 131 in order to produce a hard-determination result which is the result of the hard determination. The determiner 132 supplies the hard-determination result to the first latch circuit $121_1$ of the variable-coefficient filter 120 and the coefficient updating block 140.

To put it in detail, if the single-carrier signal supplied to the variable-coefficient filter 110 is a modulated signal obtained as a result of modulation carried out by adoption of the 16QAM modulation method for example, that is, if a symbol of the single-carrier signal in the transmitting apparatus 11 is a symbol mapped onto any signal point determined by the 16QAM modulation method from 16 signal points on the IQ constellation for example, the determiner 132 detects a signal point closest to a signal point represented by the grand sum produced by the adder 131 as a signal point on the IQ constellation among the 16 signal points on the IQ constellation. Then, the determiner 132 outputs a value representing the detected signal point to the variable-coefficient filter 120 and the coefficient updating block 140 as a hard-determination result of the grand sum produced by the adder 131.

The variable-coefficient filter 120, the adder 131 and the determiner 132 which are described above form a DFE (Decision Feedback Equalizer).

Thus, the grand sum produced by the adder 131 as a result of the equalization processing carried out on the single-carrier signal is also the output of the DFE.

On the basis of the grand sum produced by the adder 131 and a hard-determination result generated by the determiner 132 as the hard-determination result for the grand sum, the coefficient updating block 140 updates the tap coefficients $c_1$, $c_2$, ... and $c_N$ of the variable-coefficient filter 110 as well as the tap coefficients $c_1'$, $c_2'$, ... and $c_M'$ of the variable-coefficient filter 120 in order to reduce an error between the grand sum produced by the adder 131 and a hard-determination result generated by the determiner 132 as the hard-determination result for the grand sum.

Then, the coefficient updating block 140 supplies the updated tap coefficients $c_1$, $c_2$, ... and $c_N$ to the variable-coefficient filter 110 as well as the updated tap coefficients $c_1'$, $c_2'$, ... and $c_M'$ to the variable-coefficient filter 120.

Typically, the coefficient updating block 140 adopts the LMS (Least Mean Square) algorithm as a method for updating the tap coefficients $c_1$, $c_2$, ... and $c_N$ as well as the tap coefficients $c_1'$, $c_2'$, ... and $c_M'$ on the basis of the grand sum produced by the adder 131 and a hard-determination result generated by the determiner 132 as the hard-determination result for the grand sum.

As described above, in the single-carrier equalization processing carried out by the single-carrier equalizer having the configuration explained so far, the FFE composed of the variable-coefficient filter 110 equalizes a single-carrier signal to generate an equalization result whereas the DFE composed of the variable-coefficient filter 120, the adder 131 and the determiner 132 equalizes the equalization result generated by the FFE.

[Equalizer for Carrying Out Multi-Carrier Equalization Processing by Itself]

Figure 10:
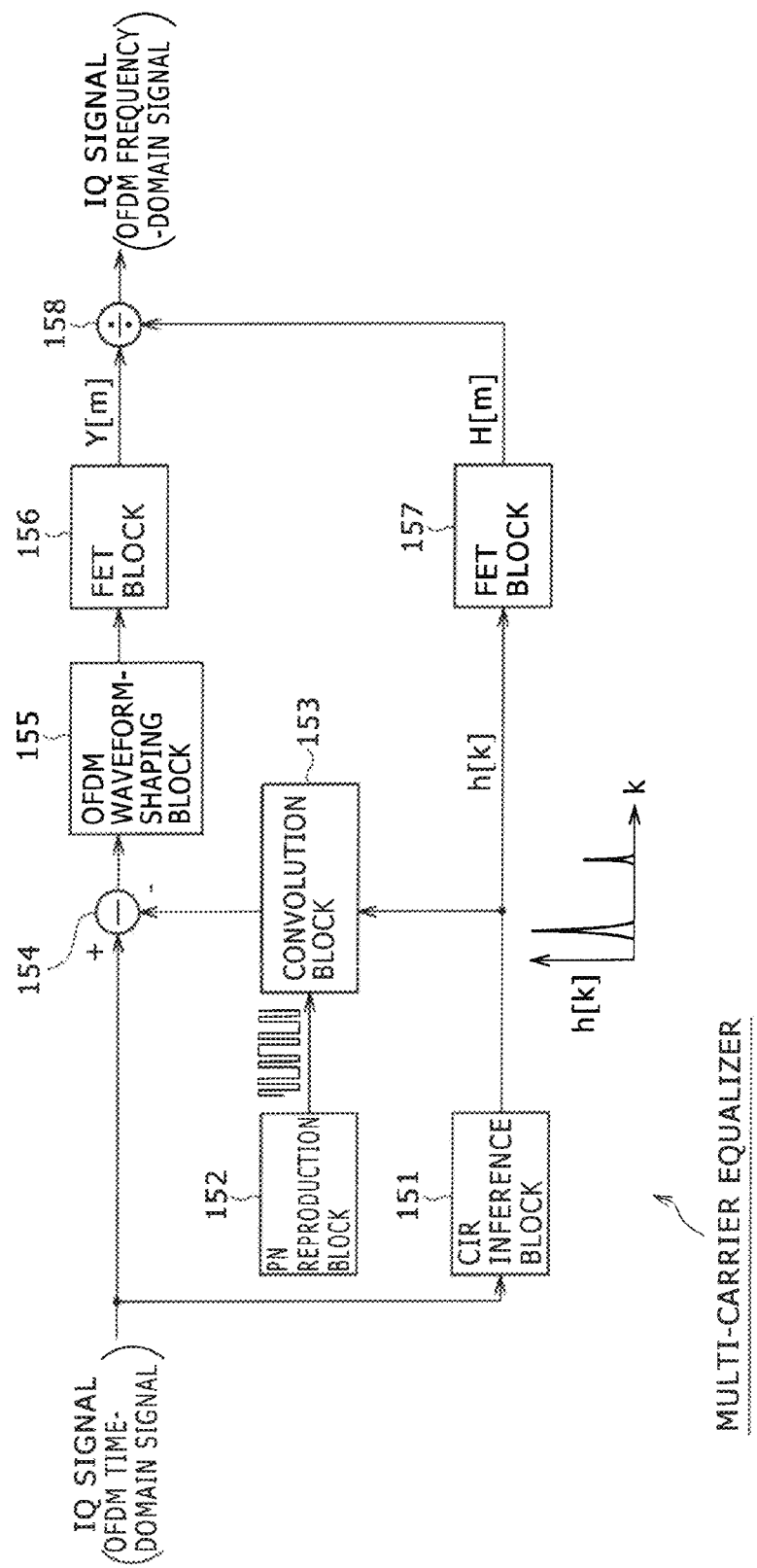
FIG. 10 is a block diagram showing a typical configuration of a multi-carrier equalizer serving as an equalizer for carrying out multi-carrier equalization processing by itself.

FIG. 10 is a block diagram showing a typical configuration of a multi-carrier equalizer serving as an equalizer for carrying out multi-carrier equalization processing by itself.

As shown in FIG. 10, the multi-carrier equalizer employs a CIR (Channel Impulse Response) inference block 151, a PN reproduction block 152, a convolution block 153, a subtractor 154, an OFDM waveform shaping block 155, FFT blocks 156 and 157 as well as a divider 158.

The multi-carrier equalizer receives a multi-carrier signal which is an IQ signal serving as the object of the multi-carrier equalization processing. To be more specific, the multi-carrier signal is supplied to the CIR inference block 151 and the subtractor 154.

The CIR inference block 151 infers the characteristic of a transmission line, through which the multi-carrier signal has been transmitted, from the multi-carrier signal, and supplies an impulse response as the inferred value of the characteristic to the convolution block 153 as well as the FFT block 157.

As explained earlier, the multi-carrier signal which is an IQ signal serving as the object of the multi-carrier equalization processing supplied to the multi-carrier equalizer is the multi-carrier signal output by the SRRC filter 76 shown in FIG. 8. Thus, as described before by referring to FIG. 5, in the case of an OFDM signal, the multi-carrier signal is a time-domain OFDM signal including the known PN-group symbols referred to as the frame header of a baseband signal shown in FIG. 6.

The PN reproduction block 152 generates the same PN group as that used as a frame header and supplies the PN group to the convolution block 153. The generated PN group is thus the same as the PN group generated by the frame-header outputting section 27 employed in the transmitting apparatus 11 shown in FIGS. 2 and 5.

The convolution block 153 carries out filtering on the PN group received from the PN reproduction block 152 by making use of (the same frequency characteristic as) the transmission-line characteristic inferred by the CIR inference block 151 in order to find a PN group affected by the transmission line and supplies the found PN group to the subtractor 154.

In the frequency domain, the process of carrying out filtering on the PN group by making use of (the same frequency characteristic as) the transmission-line characteristic is an operation to multiply the frequency components of the PN group by (the transfer function of) the transmission-line characteristic. In the time domain, on the other hand, the process of carrying out filtering on the PN group by making use of (the same frequency characteristic as) the transmission-line characteristic is convolution of the PN group with the impulse response of the transmission-line characteristic.

The convolution block 153 convolutes the PN group received from the PN reproduction block 152 with an impulse response generated by the CIR inference block 151 as the impulse response of the transmission-line characteristic in order to carry out filtering on the PN group by making use of the transmission-line characteristic and supplies the result of the convolution to the subtractor 154 to represent a PN-group affected by the transmission line.

The subtractor 154 subtracts the PN group supplied thereto by the convolution block 153 from the OFDM time-domain signal supplied thereto as a multi-carrier signal, which is an IQ signal serving as the object of the multi-carrier equalization processing, in order to remove the PN group used as the frame header included in the OFDM time-domain signal from the OFDM time-domain signal. The OFDM time-domain signal is an OFDM signal in the time-domain. The OFDM time-domain signal with the PN group removed is referred to as a post-PN-elimination signal. The subtractor 154 supplies (or outputs) the post-PN-elimination signal to the OFDM waveform shaping block 155.

The OFDM waveform shaping block 155 shapes the waveform of the post-PN-elimination signal received from the subtractor 154 and supplies a post-PN-elimination signal obtained as a result of the waveform shaping to the FFT block 156.

The FFT block 156 carries out FFT processing on the post-PN-elimination and post-waveform-shaping signal received from the OFDM waveform shaping block 155 in order to generate an OFDM frequency-domain signal as a OFDM signal in the frequency-domain and supplies the OFDM frequency-domain signal to the divider 158.

On the other hand, the FFT block 157 carries out FFT processing on the impulse response received from the CIR inference block 151 as a response representing the characteristic of the transmission line in order to find a transfer function serving as the characteristic of the transmission line and supplies the transfer function to the divider 158.

The divider 158 divides the OFDM frequency-domain signal received from the FFT block 156 by a transfer function received from the FFT block 157 as the transfer function serving as the characteristic of the transmission line in order to carry out distortion correction to correct distortions given by the transmission line to the OFDM frequency-domain signal. The divider 158 outputs an OFDM frequency-domain signal, which has resulted from the distortion correction, as a result of the multi-carrier equalization processing carried out on the multi-carrier signal supplied to the multi-carrier equalizer.

In the multi-carrier equalizer having the configuration described above, the CIR inference block 151 infers an impulse response serving as a transfer function whereas the convolution block 153 convolutes a PN group with the impulse response of the transmission-line characteristic in a process of carrying out filtering on the PN group by making use of the characteristic of the transmission line in order to find a PN group affected by the transmission line.

Then, the subtractor 154 subtracts the PN group affected by the transmission line from the OFDM time-domain signal serving as the multi-carrier signal in order to remove the PN group used as the frame header included in the OFDM time-domain signal from the OFDM time-domain signal to obtain a post-PN-elimination signal. The subtractor 154 supplies the post-PN-elimination signal to the OFDM waveform shaping block 155 which then shapes the waveform of the post-PN-elimination signal.

Subsequently, the divider 158 divides the OFDM frequency-domain signal by the transfer function in order to equalize the OFDM frequency-domain signal. The OFDM frequency-domain signal supplied to the divider 158 is a result of transforming the post-PN-elimination signal into a signal in the frequency-domain whereas the transfer function is a result of transforming the impulse response of the transmission-line characteristic into a signal in the frequency domain.

The processing carried out by the multi-carrier equalizer as described above is referred to as multi-carrier equalization processing.

Figure 11:
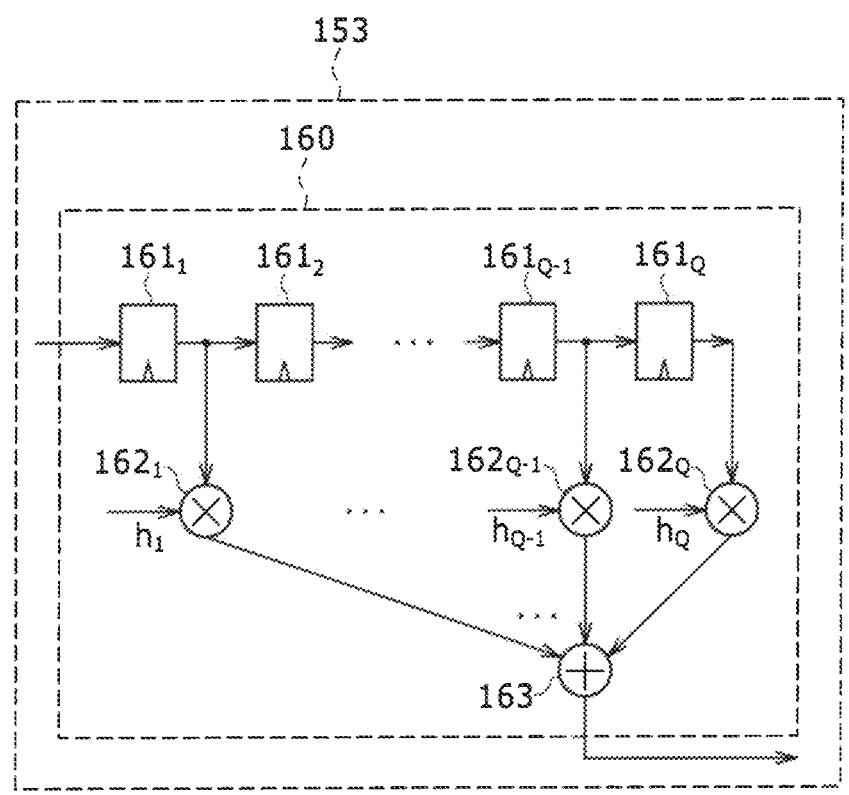
FIG. 11 is a block diagram showing a typical configuration of a convolution block.

FIG. 11 is a block diagram showing a typical configuration of the convolution block 153 shown in FIG. 10.

As shown in the figure, the convolution block 153 is configured as a variable-coefficient filter 160.

The variable-coefficient filter 160 is a digital filter with variable tap coefficients. The variable-coefficient filter 160 carries out the product-sum operations on input data supplied to the variable-coefficient filter 160 and the variable tap coefficients to produce a result of the product-sum operations as a result of digital filtering carried out on the input data.

To put it in detail, the variable-coefficient filter 160 is an FIR filter which is a filter having a plurality of taps, the number of which is Q. As shown in the figure, the variable-coefficient filter 160 is configured to include Q latch circuits $161_1$, $161_2$, ... and $161_Q$, Q multipliers $162_1$, $162_2$, ... and $162_Q$ as well as an adder 163.

The Q latch circuits $161_1$, $161_2$, ... and $161_Q$ are connected to each other in series. In this series connection, the latch circuit $161_q$ receives data latched in the latch circuit $161_{q-1}$ provided at a stage immediately preceding the stage of the latch circuit $161_q$ where q=1, 2, ... and Q.

That is to say, the latch circuit $161_q$ latches data held in the latch circuit $161_{q-1}$ provided at a stage immediately preceding the stage of the latch circuit $161_q$, supplying the data latched therein to the latch circuit $161_{q+1}$ and the multiplier $162_q$ which are provided at a stage immediately succeeding the stage of the latch circuit $161_q$.

It is to be noted that the first latch circuit $161_1$ of the variable-coefficient filter 160 receives a PN group from the PN reproduction block 152 shown in FIG. 10.

The multiplier $162_q$ receives data latched in the latch circuit $161_q$ from the latch circuit $161_q$ and an impulse response of the transmission-line characteristic from the CIR inference block 151 shown in FIG. 10.

The multiplier $162_q$ multiplies the data latched in the latch circuit $161_q$ by the tap coefficient $h_q$ received from the CIR inference block 151 and outputs a product obtained as the result of the multiplication to the adder 163. In this case, the tap coefficient $h_q$ is the qth (sampled) impulse response received from the CIR inference block 151 as the impulse response of the transmission-line characteristic.

The adder 163 carries out an operation to sum up such products received from the Q multipliers $162_1$, $162_2$, ... and $162_Q$ in order to produce the sum of the products as a result of the summing-up operation.

Thus, the variable-coefficient filter 160 is an FIR filter for carrying out product-sum operations on the PN group supplied by the PN reproduction block 152 and the impulse responses each received from the CIR inference block 151 as the impulse response of the transmission-line characteristic in order to carry out filtering on the PN group by making use of the impulse responses. The FIR filter for carrying out such product-sum operations is referred to as a convolution FIR filter for carrying out convolution which is the product-sum operations.

FIGS. 12A and 12B are a plurality of explanatory diagrams referred to in the following description of processing carried out by the subtractor 154 shown in FIG. 10.

As explained before by referring to FIG. 10, the subtractor 154 receives the OFDM time-domain signal as the multi-carrier signal which is an IQ signal serving as the object of the multi-carrier equalization processing and the PN group affected by the transmission line from the convolution block 153.

To be more specific, FIG. 12A is an explanatory diagram showing the OFDM time-domain signal supplied to the subtractor 154.

The OFDM time-domain signal shown in FIG. 12A is a multi-path signal of two paths P1 and P2.

In addition, the waves of the path P2 are delayed from the waves of the path P1. The PN group serving as the frame header of each paths P1 and P2 is affected by the transmission line.

The subtractor 154 subtracts the PN group supplied thereto by the convolution block 153 as a PN group affected by the transmission line from the OFDM time-domain signal shown in FIG. 12A in order to remove the transmission-line-affected PN group used as the frame header included in the OFDM time-domain signal from the OFDM time-domain signal. The OFDM time-domain signal with the PN group removed is referred to as a post-PN-elimination signal which is the output signal of the subtractor 154.

On the other hand, FIG. 12B is an explanatory diagram showing the post-PN-elimination signal which is a signal obtained by removing the PN group affected by the transmission line from the OFDM time-domain signal shown in FIG. 12A.

The subtractor 154 supplies the post-PN-elimination signal shown in FIG. 12B to the OFDM waveform shaping block 155 shown in FIG. 10.

FIGS. 13A and 13B are a plurality of explanatory diagrams referred to in the following description of processing carried out by the OFDM waveform shaping block 155 shown in FIG. 10.

To be more specific, FIG. 13A is an explanatory diagram showing the post-PN-elimination signal supplied by the subtractor 154 shown in FIG. 10 to the OFDM waveform shaping block 155 shown in FIG. 10. FIG. 13A is the same diagram as FIG. 12B.

The post-PN-elimination signal shown in FIG. 13A is a multi-path signal of two paths P1 and P2. In addition, the waves of the path P2 are delayed from the waves of the path P1. The reader is requested to pay attention to a certain frame body. The frame body of interest on the path P2 is delayed from the corresponding frame body of interest on the path P1.

In order to shape the waveform of the post-PN-elimination signal shown in FIG. 13A into the waveform of a post-PN-elimination signal shown in FIG. 13B, the OFDM waveform shaping block 155 temporarily stores the post-PN-elimination signal shown in FIG. 13A in a memory, resulting in the post-PN-elimination signal shown in FIG. 13B which is delayed from the post-PN-elimination signal shown in FIG. 13A. The waveform of the post-PN-elimination signal shown in FIG. 13A is shaped into the waveform of a post-PN-elimination signal shown in FIG. 13B as follows.

Let a range be defined in the post-PN-elimination signal shown in FIG. 13A to start from the position of the end of the frame body of interest on the path P1 arriving earlier and end at the position of the end of the frame body of interest on the path P2 arriving later. This range is shown in the figure as a range in a square enclosed by a dashed bold line. The last portion of the frame body of interest on the path P2 is copied (or added) to a portion in front of the frame body of interest on the path P2. The portion in front of the frame body of interest on the path P2 is a portion which starts from the position of the beginning of the frame body of interest on the path P1 and ends at the position of the beginning of the frame body of interest on the path P2.

For an OFDM signal, by copying the last portion of an effective symbol which is the unit of a symbol serving as an object of IFFT processing carried out on the signal transmitting side to the portion in front of the effective symbol, the tolerance for a multi-path line may be improved in some cases. In the case of the embodiment, however, the OFDM waveform shaping block 155 copies the last portion of a frame body of the post-PN-elimination signal to the portion in front of the frame body in order to shape the waveform of the post-PN-elimination signal.

The OFDM waveform shaping block 155 supplies a post-PN-elimination signal obtained as a result of the waveform shaping to the FFT block 156. The FFT block 156 caries out FFT processing on the post-PN-elimination signal in an FFT segment serving as an object of the FFT processing carried out once. As shown in FIG. 13B, the FFT segment is a range starting at the position of the beginning of the frame body of interest on the path P1 and ending at the position of the end of the same frame body.

In order to make the receiving apparatus 12 shown in FIG. 8 capable of receiving both single-carrier and multi-carrier signals, there has been proposed a method of providing the equalization section 77 shown in FIG. 8 with both the single-carrier equalizer shown in FIG. 9 and the multi-carrier equalizer shown in FIG. 10 as separated equalizers. By adoption of this method, however, the size of the receiving apparatus 12 increases.

In order to solve this problem, the equalization section 77 shown in FIG. 8 is configured to be capable of carrying out single-carrier equalization processing and multi-carrier equalization processing by making use of two common variable-coefficient filters shared by the single-carrier equalization processing and the multi-carrier equalization processing.

[Typical Configuration of the Equalization Section 77]

Figure 14:
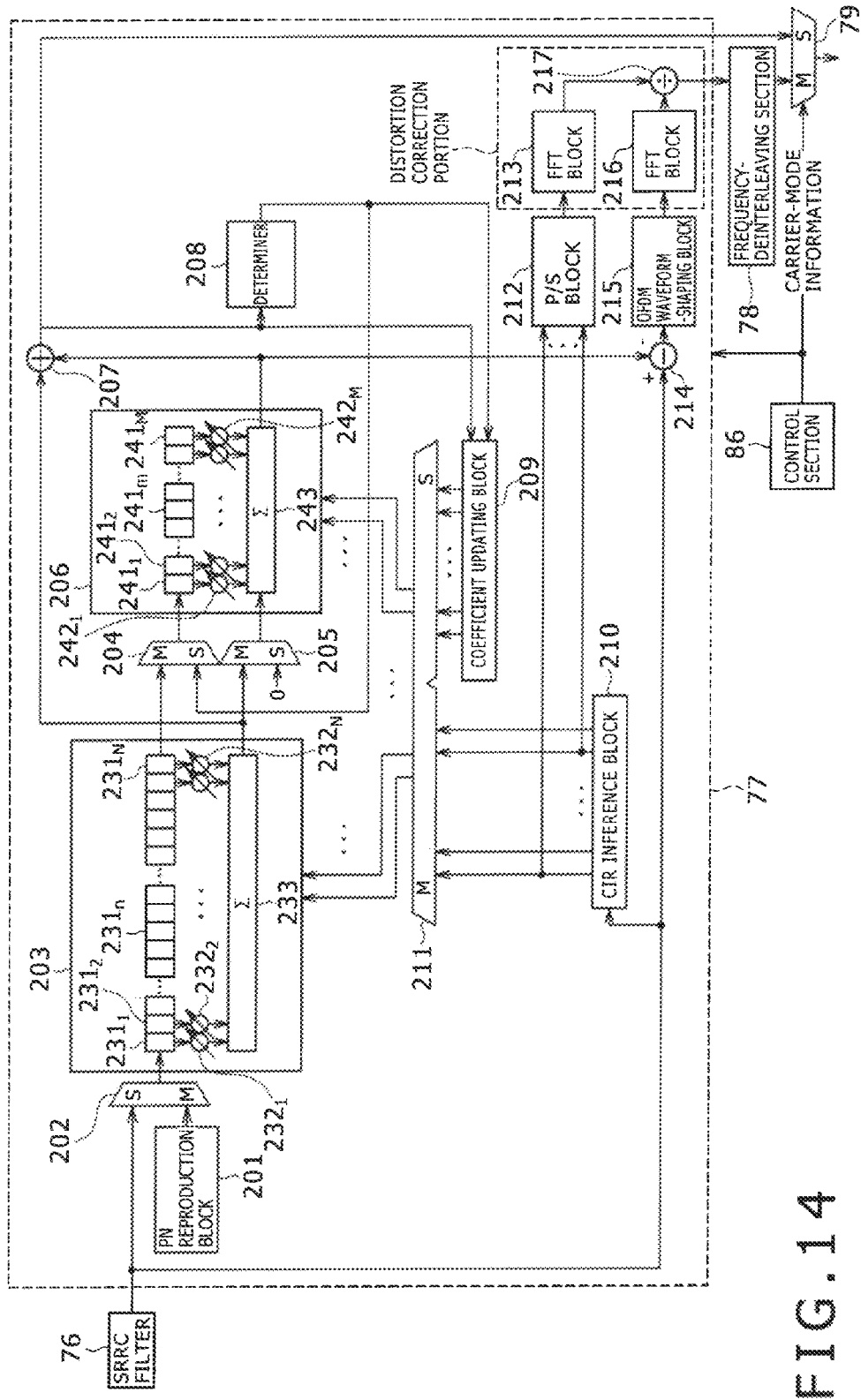
FIG. 14 is a block diagram showing a typical configuration of an equalization section.

FIG. 14 is a block diagram showing a typical configuration of the equalization section 77.

As shown in FIG. 14, the equalization section 77 employs two variable-coefficient filters 203 and 206.

To put it in detail, the equalization section 77 is configured to employ a PN reproduction block 201, a selector 202, the variable-coefficient filter 203, selectors 204 and 205, the variable-coefficient filter 206, an adder 207, a determiner 208, a coefficient updating block 209, a CIR inference block 210, a selector 211, a PS (Parallel/Serial) block 212, an FFT block 213, a subtractor 214, an OFDM waveform shaping block 215, an FFT block 216 as well as a divider 217.

An IQ signal received by the equalization section 77 shown in FIG. 14 from the SRRC filter 76 shown in FIG. 8 is supplied to the selector 202, the CIR inference block 210 and the subtractor 214 whereas carrier mode received by the equalization section 77 from the control section 86 shown in FIG. 8 is supplied to the selectors 202, 204, 205 and 211.

It is to be noted that, in order to prevent FIG. 14 from becoming complicated, connection lines for supplying the carrier mode from the control section 86 to the selectors 202, 204, 205 and 211 are not shown in the figure.

The PN reproduction block 201 generates the same PN group as that generated by the frame-header outputting section 27 employed in the transmitting apparatus 11 shown in FIGS. 2 and 5, supplying the PN group to the selector 202 as a frame header.

In accordance with the carrier mode received from the control section 86, the selector 202 selects the IQ signal received from the SRRC filter 76 or the PN group received from the PN reproduction block 201 and supplies the selected one to the variable-coefficient filter 203.

To be more specific, if the carrier mode indicates that the carrier mode is a single-carrier mode, the selector 202 selects the IQ signal received from the SRRC filter 76 as a single-carrier signal and supplies the single-carrier signal to the variable-coefficient filter 203.

If the carrier mode indicates that the carrier mode is a multi-carrier mode, on the other hand, the selector 202 selects the PN group received from the PN reproduction block 201 and supplies the PN group to the variable-coefficient filter 203.

The variable-coefficient filter 203 is a digital filter having variable tap coefficients. The variable-coefficient filter 203 carries out product-sum operations on input data supplied thereto and the variable tap coefficients, producing the result of the operations as a result of filtering carried out on the input data.

The variable-coefficient filter 203 is a filter having a plurality of taps, the number of which is N. The variable-coefficient filter 203 is configured to include N latch circuits $231_1$, $231_2$, ... and $231_N$, N multipliers $232_1$, $232_2$, ... and $232_N$ as well as an adder 233.

The N latch circuits $231_1$, $231_2$, ... and $231_N$ are connected to each other in series. In this series connection, the latch circuit $231_n$ receives data latched in the latch circuit $231_{n-1}$ provided at a stage immediately preceding the stage of the latch circuit $231_n$ where n=1, 2, ... and N.

That is to say, the latch circuit $231n$ latches data held in the latch circuit $231_{n-1}$ provided at a stage immediately preceding the stage of the latch circuit $231_n$, supplying the data latched therein to the latch circuit $231_{n+1}$ and the multiplier $232_n$ which are provided at a stage immediately succeeding the stage of the latch circuit $231_n$.

It is to be noted that the first latch circuit 2311 of the variable-coefficient filter 203 receives an IQ signal from the selector 202.

The multiplier $232_n$ receives data latched in the latch circuit $231_n$ and a tap coefficient from the selector 211.

The multiplier $232_n$ multiplies the data latched in the latch circuit $231_n$ by the tap coefficient received from the selector 211 and outputs a product obtained as the result of the multiplication to the adder 233.

The adder 233 carries out an operation to sum up such products received from the N multipliers $232_1$, $232_2$, ... and $232_N$ in order to produce the sum of the products as a result of the summing-up operation.

The adder 233 outputs the sum of the products to the selector 205 and the adder 207. As described above, each of these products is a product of data latched in a latch circuit and a tap coefficient, and the sum of the products is the result of the product-sum operations.

It is to be noted that data latched in the last latch circuit $231_N$ of the variable-coefficient filter 203 is supplied to the last multiplier $232_N$ and the selector 204.

The selector 204 receives the data latched in the last latch circuit 231N of the variable-coefficient filter 203 and a hard-determination result produced by the determiner 208.

In accordance with the carrier mode received from the control section 86, if the carrier mode indicates that the carrier mode is the single-carrier mode, the selector 204 selects the hard-determination result produced by the determiner 208 and supplies the hard-determination result to the variable-coefficient filter 206. If the carrier mode indicates that the carrier mode is the multi-carrier mode, on the other hand, the selector 204 selects the data latched in the last latch circuit $231_N$ and supplies the data to the variable-coefficient filter 206.

The selector 205 receives the sum of products from the adder 233 employed in the variable-coefficient filter 203 and the value of 0. As described above, the sum of products is the result of the product-sum operations carried out by the variable-coefficient filter 203. In the following description, the sum of products is also referred to as a product sum.

In accordance with the carrier mode received from the control section 86, the selector 205 selects the product sum produced by the adder 233 employed in the variable-coefficient filter 203 or the value of 0. To be more specific, if the carrier mode indicates that the carrier mode is the single-carrier mode, the selector 205 selects the value of 0 and supplies the value of 0 to the variable-coefficient filter 206. If the carrier mode indicates that the carrier mode is the multi-carrier mode, on the other hand, the selector 205 selects the product sum received from the adder 233 and supplies the product sum to the variable-coefficient filter 206.

By the same token, the variable-coefficient filter 206 is a filter having a plurality of taps, the number of which is M. The variable-coefficient filter 206 is configured to include M latch circuits $241_1$, $242_2$, ... and $241_M$, M multipliers $242_1$, $242_2$, ... and $242_M$ as well as an adder 243.

The M latch circuits $241_1$, $242_2$, ... and $241_M$ are connected to each other in series. In this series connection, the latch circuit $241_m$ receives data latched in the latch circuit $241_{m-1}$ provided at a stage immediately preceding the stage of the latch circuit $241_m$ where m=1, 2, ... and M.

That is to say, the latch circuit $241_m$ latches data held in a latch circuit $241_{m-1}$ provided at a stage immediately preceding the stage of the latch circuit $241_m$, supplying the data latched therein to the latch circuit $241_{m+1}$ and the multiplier $242_m$ which are provided at a stage immediately succeeding the stage of the latch circuit $241_m$.

It is to be noted that the first latch circuit $241_1$ of the variable-coefficient filter 206 receives a signal output by the selector 204. The signal output by the selector 204 is data latched in the last latch circuit $231_N$ of the variable-coefficient filter 203 or a hard-determination result output by the determiner 208.

The multiplier $242_m$ receives data latched in the latch circuit $241_m$ and a tap coefficient from the selector 211.

The multiplier $242_m$ multiplies the data latched in the latch circuit $241_m$ by the tap coefficient received from the selector 211 and outputs a product obtained as the result of the multiplication to the adder 243.

The adder 243 carries out an operation to sum up a signal output by the selector 205 and such products received from the M multipliers $242_1$, $242_2$, ... and $242_M$ in order to produce the sum of the products as a result of the summing-up operation. The signal output by the selector 205 can be the value of 0 or the product sum output by the adder 233 employed in the variable-coefficient filter 203. The product sum output by the adder 233 is the result of the product-sum operations carried out by the variable-coefficient filter 203.

The sum produced by the adder 243 is supplied to the adder 207 and the subtractor 214.

The adder 207 adds the sum received from the adder 233 employed in the variable-coefficient filter 203 to the sum received from the adder 243 employed in the variable-coefficient filter 206 in order to produce a grand sum and outputs the grand sum to the select section 79 shown in FIG. 8. The grand sum is the result of the equalization carried out on the single-carrier signal which is the IQ signal supplied by the SRRC filter 76 to the equalization section 77.

In addition, the adder 207 outputs the grand sum of the sum received from the adder 233 and the sum received from the adder 243 to the determiner 208 and the coefficient updating block 209.

The determiner 208 carries out hard determination on the grand sum received from the adder 207 in order to produce a hard-determination result which is the result of the hard determination. The determiner 208 supplies the hard-determination result to the selector 204 and the coefficient updating block 209.

On the basis of the grand sum produced by the adder 207 and a hard-determination result generated by the determiner 208 as the hard-determination result for the grand sum, the coefficient updating block 209 updates the tap coefficients of the variable-coefficient filter 203 and the tap coefficients of the variable-coefficient filter 206 in order to reduce an error between the grand sum produced by the adder 207 and a hard-determination result generated by the determiner 208 as the hard-determination result for the grand sum. Then, the coefficient updating block 209 supplies the updated tap coefficients to the selector 211.

Typically, the coefficient updating block 209 adopts the LMS algorithm as a method for updating the tap coefficients of the variable-coefficient filter 203 and the tap coefficients of the variable-coefficient filter 206 on the basis of the grand sum produced by the adder 207 and a hard-determination result generated by the determiner 208 as the hard-determination result for the grand sum.

From an IQ signal supplied by the SRRC filter 76 to the equalization section 77, the CIR inference block 210 infers the characteristic of a transmission line, through which the IQ signal has been transmitted, and supplies sampled values on the time axis in parallel to the selector 211 and the P/S block 212. The sampled value is an impulse response which is an inferred value representing the characteristic of the transmission line.

In accordance with the carrier mode received from the control section 86, the selector 211 selects a tap coefficient received from the coefficient updating block 209 or an impulse response received from the CIR inference block 210 as the impulse response of the transmission line and supplies the selected tap coefficient or impulse response to the variable-coefficient filters 203 and 206.

To be more specific, if the carrier mode received from the control section 86 indicates that the carrier mode is the single-carrier mode, the selector 211 selects a tap coefficient received from the coefficient updating block 209 and supplies the selected tap coefficient to the variable-coefficient filters 203 and 206.

If the carrier mode received from the control section 86 indicates that the carrier mode is the multi-carrier mode, on the other hand, the selector 211 selects an impulse response received from the CIR inference block 210 as the impulse response of the transmission line and supplies the selected impulse response to the variable-coefficient filters 203 and 206.

The P/S block 212 converts the time-axis sampled values supplied thereto in parallel by the CIR inference block 210 to represent impulse responses serving as the characteristic of the transmission line into serial data and supplies the serial data to the FFT block 213.

The FFT block 213 carries out FFT processing on an impulse response received from the P/S block 212 as the impulse response representing the characteristic of the transmission line in order to find a transfer function representing the characteristic of the transmission line and supplies the transfer function to the divider 217.

The subtractor 214 subtracts the sum received from the adder 243 employed in the variable-coefficient filter 206 from the IQ signal received from the SRRC filter 76 in order to find a post-PN-elimination signal explained earlier by referring to FIGS. 12A and 12B. Then, the subtractor 214 supplies (or outputs) the post-PN-elimination signal to the OFDM waveform shaping block 215.

As described before by referring to FIGS. 13A and 13B, the OFDM waveform shaping block 215 carries out a process of shaping the waveform of the post-PN-elimination signal received from the subtractor 214 and supplies a resulting post-PN-elimination signal to the FFT processing section 216.

The FFT block 216 carries out FFT processing on the post-PN-elimination signal received from the OFDM waveform shaping block 215 in order to obtain an OFDM frequency-domain signal which is an OFDM signal in the frequency domain and supplies the OFDM frequency-domain signal to the divider 217.

The divider 217 divides the OFDM frequency-domain signal received from the FFT block 216 by a transfer function received from the FFT block 213 as the transfer function serving as the characteristic of the transmission line in order to carry out distortion correction for correcting distortions given by the transmission line to the OFDM frequency-domain signal. The divider 217 supplies an OFDM frequency-domain signal resulting from the distortion correction to the frequency-deinterleaving section 78 shown in FIG. 8 as a result of the multi-carrier equalization processing carried out on the multi-carrier signal which is the IQ signal supplied by the SRRC filter 76 to the equalization section 77.

With the equalization section 77 having the configuration described above, if the IQ signal supplied by the SRRC filter 76 to the equalization section 77 is a single-carrier signal, that is, if the carrier mode received by the equalization section 77 from the control section 86 indicates that the carrier mode is the single-carrier mode, the equalization section 77 carries out the single-carrier equalization processing which is the equalization processing provided for a single-carrier signal.

In the single-carrier equalization processing carried out by the equalization section 77, each of the selectors 202, 204, 205 and 211 selects a proper one of the input signals supplied thereto as described above so that the variable-coefficient filter 203 forms an FFE carrying out processing on the single-carrier signal whereas the variable-coefficient filter 206 forms a DFE carrying out processing on a signal output by the FFE.

If the IQ signal supplied by the SRRC filter 76 to the equalization section 77 is a multi-carrier signal, that is, if the carrier mode received by the equalization section 77 from the control section 86 indicates that the carrier mode is the multi-carrier mode, on the other hand, the equalization section 77 carries out the multi-carrier equalization processing which is the equalization processing provided for a multi-carrier signal.

In the multi-carrier equalization processing carried out by the equalization section 77, each of the selectors 202, 204, 205 and 211 selects the other one of the input signals supplied thereto as described above so that the two variable-coefficient filters 203 and 206 together form one FIR filter for carrying out filtering on a PN group, which has been inserted into the OFDM signal as a multi-carrier signal at a transmission time, by making use of the characteristic of the transmission line conveying the OFDM signal transmitted as a multi-carrier signal.

It is to be noted that, when the equalization section 77 is carrying out the multi-carrier equalization processing, the FFT blocks 213 and 216 as well as the divider 217 form a distortion correction portion for eliminating distortions given by the transmission line to the OFDM signal serving as a multi-carrier signal in the frequency domain.

Figure 15:
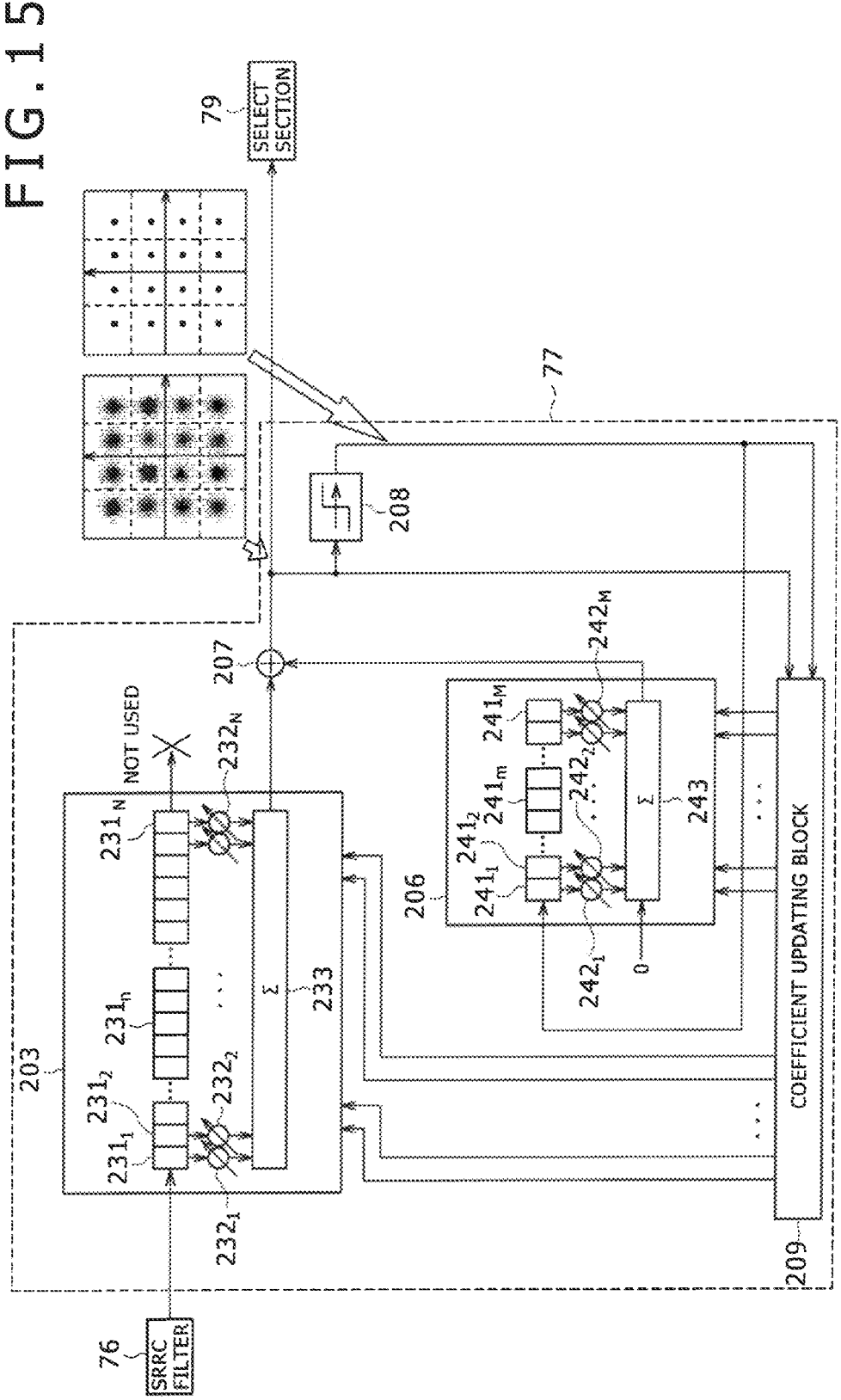
FIG. 15 is a block diagram showing the configuration of the equalization section essentially carrying out single-carrier equalization processing.

FIG. 15 is a block diagram showing the configuration of the equalization section 77 shown in FIG. 14 as an equalization section essentially carrying out the single-carrier equalization processing.

As described above, if the carrier mode received by the equalization section 77 from the control section 86 indicates that the carrier mode is the single-carrier mode, the equalization section 77 carries out the single-carrier equalization processing.

That is to say, if the carrier mode is the single-carrier mode, that is, if the IQ signal supplied by the SRRC filter 76 to the equalization section 77 is a single-carrier signal, the selector 202 employed in the equalization section 77 shown in FIG. 14 selects the single-carrier signal which is the IQ signal supplied by the SRRC filter 76 to the equalization section 77 and supplies the single-carrier signal to the first latch circuit $231_1$ of the variable-coefficient filter 203.

In addition, the selector 204 selects the hard-determination result received from the determiner 208 and supplies the hard-determination result to the first latch circuit $241_1$ of the variable-coefficient filter 206. On the other hand, the selector 205 selects the value of 0 and supplies the value to the adder 243 employed in the variable-coefficient filter 206.

On top of that, the selector 211 selects a tap coefficient received from the coefficient updating block 209 and supplies the tap coefficient to the multiplier $232_n$ employed in the variable-coefficient filter 203 as well as the multiplier $242_m$ employed in the variable-coefficient filter 206.

As a result, as shown in FIG. 15, the equalization section 77 has a configuration essentially identical with that of the single-carrier equalizer shown in FIG. 9. Thus, the equalization section 77 carries out the single-carrier equalization processing.

That is to say, the variable-coefficient filters 203 and 206, the adder 207, the determiner 208 and the coefficient updating block 209 which are shown in FIG. 15 correspond to respectively the variable-coefficient filters 110 and 120, the adder 131, the determiner 132 and the coefficient updating block 140 which are shown in FIG. 9.

Thus, in the equalization section 77 shown in FIG. 15, the variable-coefficient filter 203 forms an FFE whereas the variable-coefficient filter 206, the adder 207 and the determiner 208 together form a DFE. The FFE and the DFE carry out single-carrier equalization processing in the same way as the single-carrier equalizer shown in FIG. 9.

To put it in detail, the variable-coefficient filter 203 functioning as the FFE employed in the equalization section 77 carries out equalization processing on the single-carrier signal and supplies the result of the processing to the adder 207.

Then, the adder 207 employed in the equalization section 77 adds a signal output by the variable-coefficient filter 203 functioning as the FFE to a signal output by the variable-coefficient filter 206 in order to produce a grand sum and outputs the grand sum as the result of equalization carried out on the single-carrier signal to the determiner 208. The determiner 208 carries out hard determination on the grand sum output by the adder 207 as the result of equalization carried out on the single-carrier signal.

Then, the variable-coefficient filter 206 carries out filtering (or equalization) on a hard-determination result as a result of the hard determination which is carried out on the grand sum output by the adder 207 as a result of equalization carried out on the single-carrier signal. The variable-coefficient filter 206 supplies the result of the filtering to the adder 207.

It is to be noted that, in the equalization section 77, on the basis of the grand sum produced by the adder 207 and the hard-determination result generated by the determiner 208 as the result of the hard determination carried out on the grand sum, the coefficient updating block 209 updates the tap coefficients of the variable-coefficient filter 203 and the tap coefficients of the variable-coefficient filter 206 by adoption of typically the LSM algorithm and supplies the tap coefficients to the variable-coefficient filter 203 and the variable-coefficient filter 206 (by way of the selector 211).

Figure 16:
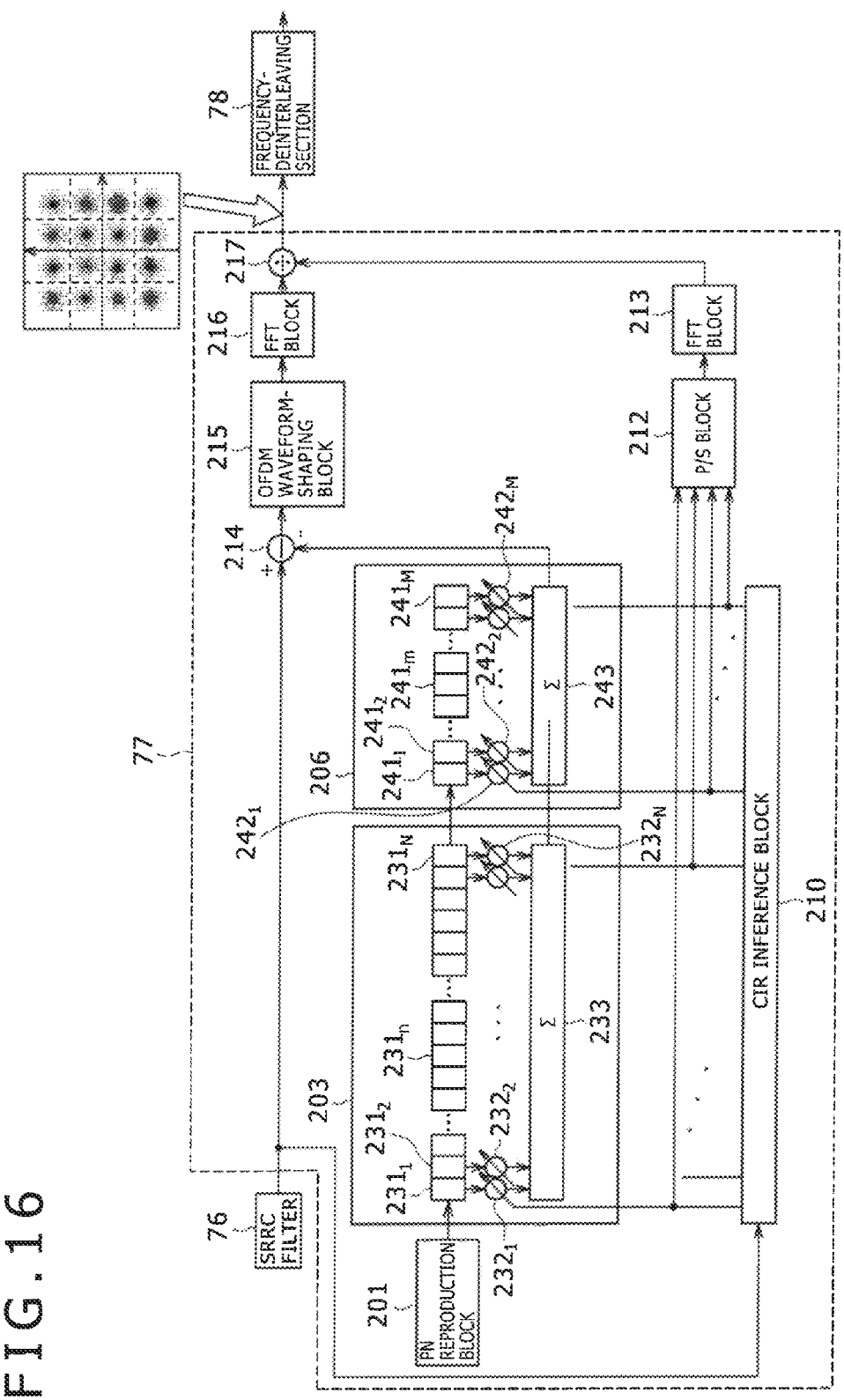
FIG. 16 is a block diagram showing the configuration of the equalization section essentially carrying out multi-carrier equalization processing.

FIG. 16 is a block diagram showing the configuration of the equalization section 77 shown in FIG. 14 as an equalization section essentially carrying out multi-carrier equalization processing.

As described above, if the carrier mode received by the equalization section 77 from the control section 86 indicates that the carrier mode is the multi-carrier mode, the equalization section 77 carries out the multi-carrier equalization processing.

That is to say, if the carrier mode is the multi-carrier mode, that is, if the IQ signal supplied by the SRRC filter 76 to the equalization section 77 is an OFDM time-domain signal serving as a multi-carrier signal, the selector 202 employed in the equalization section 77 shown in FIG. 14 selects the PN group received from the PN reproduction block 201 and supplies the PN group to the first latch circuit $231_1$ of the variable-coefficient filter 203.

In addition, the selector 204 selects data latched in the last latch circuit $231_N$ of the variable-coefficient filter 203 and supplies the data to the first latch circuit $241_1$ of the variable-coefficient filter 206. On the other hand, the selector 205 selects a sum produced by the adder 233 employed in the variable-coefficient filter 203 and supplies the sum to the adder 243 employed in the variable-coefficient filter 206. With the selectors 204 and 205 selecting as described above, the variable-coefficient filters 203 and 206 are connected to each other to form the so-called series connection and function as one FIR filter.

On top of that, the selector 211 selects sampled values on the time axis and supplies the sampled values to the multipliers $231_1$ to $231_N$ of the variable-coefficient filter 203 and the multipliers $242_1$ to $242_M$ of the variable-coefficient filter 206 as tap coefficients. A sampled value is an impulse response received from the CIR inference block 210 as an impulse response of the transmission line.

As a result, as shown in FIG. 16, the equalization section 77 has a configuration essentially identical with that of the multi-carrier equalizer shown in FIG. 10. Thus, the equalization section 77 carries out the multi-carrier equalization processing.

That is to say, the PN reproduction block 201 shown in FIG. 16 corresponds to the PN reproduction block 152 shown in FIG. 10. The CIR inference block 210 shown in FIG. 16 corresponds to the CIR inference block 151 shown in FIG. 10. The variable-coefficient filters 203 and 206 shown in FIG. 16 correspond to the convolution block 153 shown in FIG. 10. The FFT block 213 shown in FIG. 16 corresponds to the FFT block 157 shown in FIG. 10. The subtractor 214 shown in FIG. 16 corresponds to the subtractor 154 shown in FIG. 10. The OFDM waveform shaping block 215 shown in FIG. 16 corresponds to the OFDM waveform shaping block 155 shown in FIG. 10. The FFT block 216 shown in FIG. 16 corresponds to the FFT block 156 shown in FIG. 10. The divider 217 shown in FIG. 16 corresponds to the divider 158 shown in FIG. 10.

As shown in FIG. 11, the convolution block 153 shown in FIG. 10 is configured as a variable-coefficient filter 160 which is a Q-tap FIR filter.

In FIG. 16, on the other hand, the data latched in the last latch circuit $231_N$ of the variable-coefficient filter 203 is supplied to the first latch circuit $241_1$ of the variable-coefficient filter 206 (by way of the selector 204) whereas the sum produced by the adder 233 employed in the variable-coefficient filter 203 is supplied to the adder 243 employed in the variable-coefficient filter 206 (by way of the selector 205).

Thus, as a whole, the variable-coefficient filter 203 implemented by an N-tap FIR filter and the variable-coefficient filter 206 implemented by an M-tap FIR filter can be perceived as one (N+M)-tap FIR filter.

The number of taps of the FIR filter implemented as the variable-coefficient filter 110 functioning as an FFE of the single-carrier equalizer shown in FIG. 9 is N whereas the number of taps of the FIR filter implemented as the variable-coefficient filter 120 functioning as a DFE of the single-carrier equalizer shown in FIG. 9 is M. The sum (N+M) can be made equal to or greater than Q representing the number of taps in the variable-coefficient filter 160 composing the convolution block 153, which is employed in the multi-carrier equalizer shown in FIG. 10, as shown in FIG. 11. By setting the sum (N+M) at a value equal to or greater than Q, the (N+M)-tap FIR filter can be used for carrying out the function of the convolution block 153. As described above, the (N+M)-tap FIR filter is composed of the variable-coefficient filter 203 functioning as an N-tap FIR filter and the variable-coefficient filter 206 functioning as an M-tap FIR filter.

As explained before, in the equalization section 77 shown in FIG. 16, the two variable-coefficient filters 203 and 206 function as the convolution block 153 which is an FIR filter.

In addition, the CIR inference block 210 employed in the equalization section 77 infers the characteristic of the transmission line from the OFDM time-domain signal serving as a multi-carrier signal.

Then, by making use of impulse responses of the transmission-line characteristic as tap coefficients, the FIR filter implemented by the two variable-coefficient filters 203 and 206 carries out signal processing to perform filtering on the PN group reproduced by the PN reproduction block 201 whereas the subtractor 214 subtracts the result of the filtering carried out on the PN group from the OFDM time-domain signal serving as a multi-carrier signal. The result of the filtering carried out on the PN group is a signal output by the FIR filter implemented by the two variable-coefficient filters 203 and 206. The subtractor 214 outputs the result of the subtraction as a post-PN-elimination signal.

Subsequently, the OFDM waveform shaping block 215 carries out a process of shaping the waveform of the post-PN-elimination signal and outputs a post-PN-elimination signal to the FFT block 216 as a result of the waveform shaping process. Then, the FFT block 216 carries out FFT processing on the post-PN-elimination signal which is an OFDM time-domain signal in order to convert the OFDM time-domain signal into OFDM frequency-domain signal.

By the way, the impulse response of the transmission-line characteristic is parallel data. The P/S block 212 converts the parallel data of the impulse response into serial data and supplies the serial data to the FFT block 213. Then, the FFT block 213 carries out FFT processing on the serial data representing the impulse response of the transmission-line characteristic in order to convert the characteristic of the transmission line from the impulse response into a transfer function.

Subsequently, the divider 217 divides the OFDM frequency-domain signal received from the FFT block 216 by a transfer function received from the FFT block 213 as the transfer function serving as the characteristic of the transmission line in order to carry out distortion correction for correcting distortions given by the transmission line to the OFDM frequency-domain signal. The divider 217 outputs an OFDM frequency-domain signal resulting from the distortion correction as a result of the multi-carrier equalization processing carried out on the multi-carrier signal.

As described above, the equalization section 77 is configured to be capable of carrying out single-carrier equalization processing on a single-carrier signal and multi-carrier equalization processing on a multi-carrier signal by making use of the two common variable-coefficient filters 203 and 206 shared by the single-carrier equalization processing and the multi-carrier equalization processing. Thus, it is not necessary to separately provide a variable-coefficient filter to function as an FFE required for the single-carrier equalization processing, a variable-coefficient filter to function as a DFE also required for the single-carrier equalization processing and a variable-coefficient filter to function as a FIR filter for carrying out convolution required for the multi-carrier equalization processing. As a result, it is possible to reduce the size of the equalization section 77 and, hence, the size of the receiving apparatus 12 provided with equalization section 77 to serve as an apparatus capable of receiving both a single-carrier signal and a multi-carrier signal.

[Processing of the Equalization Section 77]

Figure 17:
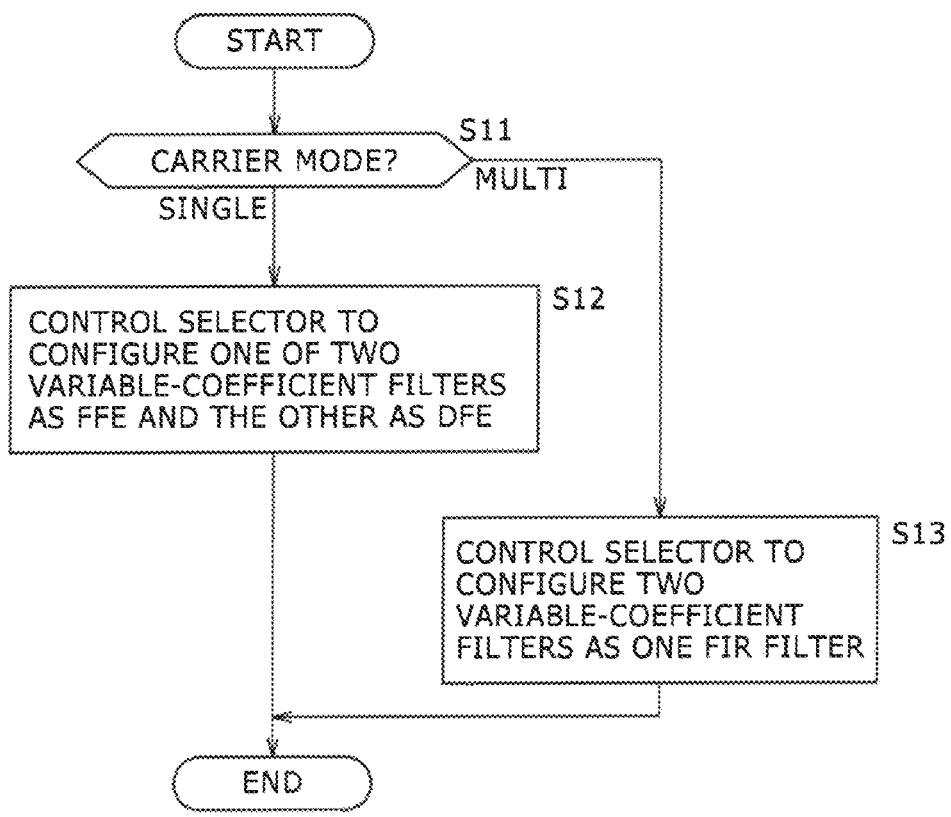
FIG. 17 shows a flowchart representing processing carried out by the equalization section.

FIG. 17 shows a flowchart representing processing carried out by the equalization section 77 shown in FIG. 14 in accordance with carrier mode received from the control section 86 shown in FIG. 8.

As shown in FIG. 17, the flowchart begins with a step S11 at which the equalization section 77 determines whether the carrier mode received from the control section 86 indicates that the carrier mode is the single-carrier mode or the multi-carrier mode.

If the equalization section 77 determines at the step S11 that the carrier mode indicates the single-carrier mode, the flow of the processing goes on to a step S12 at which the equalization section 77 controls the selectors 202, 204, 205 and 211 in order to configure the variable-coefficient filter 203 to function as an FFE and configure the variable-coefficient filter 206, the adder 207 as well as the determiner 208 to function as a DFE.

Thus, as explained before by referring to FIG. 15, the equalization section 77 is configured into the same configuration as the single-carrier equalizer shown in FIG. 9 and functions as a circuit for carrying out single-carrier equalization processing.

If the equalization section 77 determines at the step S11 that the carrier mode indicates the multi-carrier mode, on the other hand, the flow of the processing goes on to a step S13 at which the equalization section 77 controls the selectors 202, 204, 205 and 211 in order to configure the two variable-coefficient filters 203 and 206 to function as one FIR filter.

Thus, as explained before by referring to FIG. 16, the equalization section 77 is configured into the same configuration as the multi-carrier equalizer shown in FIG. 10 and functions as a circuit for carrying out multi-carrier equalization processing.

[Configuration of a Computer for the Present Disclosure]

The series of processes described previously can be carried out by making use of hardware and/or by execution of software. If the series of processes described above is carried out by execution of software, programs composing the software can be installed into typically a general-purpose computer.

FIG. 18 is a block diagram showing a typical configuration of an embodiment implementing the computer into which the programs to be executed in order to carry out the series of processes are installed.

The programs can also be stored in advance in a recording medium embedded in the computer. Typical examples of the recording medium are a ROM (Read Only Memory) 303 and a hard disk 305.

Alternatively, the program can be stored (recorded) in advance in a removable recording medium 311. The programs recorded in the removable recording medium 311 can be presented to the user as the so-called package software. Typical examples of the removable recording medium 311 include a flexible disc, a CD-ROM (Compact Disc Read Only Memory), an MO (Magneto Optical) disk, a DVD (Digital Versatile Disc), a magnetic disk and a semiconductor memory.

It is to be noted that, it is possible to install the programs from the removable recording medium 311 as described above into the computer or downloaded to the computer by making use of a communication or broadcasting network, and then installed into the hard disk 305 embedded in the computer. To put it concretely, the programs are downloaded from such as a download site to the computer through a radio communication by way of typically an artificial satellite for digital satellite broadcasting or through a wire communication by way of a network such as a LAN (Local Area Network) or the Internet.

The computer includes an embedded CPU (Central Processing Unit) 302 connected to an input/output interface 310, the ROM (Read Only Memory) 303, a RAM (Random Access Memory) 304 and the hard disk 305 by a bus 301.

When the user enters a command to the computer through the input/output interface 310 by operating an input section 307, the CPU 302 executes a program stored in advance in the ROM 303 as a program associated with the command. As an alternative, the CPU 302 loads a program associated with the command from the hard disk 305 into the RAM 304 and executes the program.

In this way, the CPU 302 carries out the processing represented by the flowchart or processing represented by the block diagrams. Then, if necessary, the CPU 302 outputs the result of the processing to an output section 306 and/or a communication section 308, which are connected to the input/output interface 310, through the input/output interface 310. The CPU 302 may also store the result of the processing in the hard disk 305. The processing result output to the output section 306 is outputted from the output section 306 whereas the processing result output to the communication section 308 is transmitted to an external destination.

It is to be noted that the input section 307 is configured to include a keyboard, a mouse and a microphone whereas the output section 306 is configured to include an LCD (Liquid Crystal Display) unit and a speaker.

In the specifications of the present disclosure, the processing executed by the computer in accordance with the program is not required to be executed along the time axis in accordance with the prescribed order in the flowchart. That is, the processing executed by the computer in accordance with the program includes the processing to be executed concurrently or individually (for example, the processing indicates parallel processing or processing executed by an object).

In addition, the programs are by no means limited to programs to be executed by only one computer (or one processor) but the programs may also be programs to be executed by a plurality of computers. On top of that, the programs may also be programs to be transferred to a remote computer for executing the programs.

It is to be noted that implementations of the present disclosure are by no means limited to the embodiment described above. That is to say, the embodiment implementing the present disclosure can be further changed to a variety of modified versions within a range not deviating from essentials of the present disclosure.

That is to say, even though the embodiment is configured to be capable of carrying out single-carrier equalization processing and multi-carrier equalization processing by making use of the two common variable-coefficient filters 203 and 206 shared by the single-carrier equalization processing and the multi-carrier equalization processing, another embodiment can be configured to be capable of carrying out the single-carrier equalization processing and the multi-carrier equalization processing by making use of three or more common variable-coefficient filters shared by the single-carrier equalization processing and the multi-carrier equalization processing.

If the single-carrier equalization processing and the multi-carrier equalization processing are carried out by making use of three or more common variable-coefficient filters, in the same way as the configuration in which the two common variable-coefficient filters 203 and 206 are shared by the single-carrier equalization processing and the multi-carrier equalization processing, the three or more common variable-coefficient filters are used as follows.

In the case of the single-carrier equalization processing, equalizers are formed by making use of the filters. Some of the three or more filters equalize an input signal supplied to a specific one of the equalizers whereas the remaining ones of the three or more filters equalize a signal output by the specific equalizer.

In the case of the multi-carrier equalization processing, on the other hand, the filters are connected to each other in series and the filters connected to each other in series are used for carrying out convolution of the PN group as signal processing determined in advance. The convolution of the PN group is a process of carrying out filtering on the PN group.

The present disclosure contains subject matter related to that disclosed in Japanese Priority Patent Application JP 2010-241310 filed in the Japan Patent Office on Oct. 27, 2010, the entire content of which is hereby incorporated by reference.

What is claimed is:

1. A signal processing apparatus comprising
circuitry configured to carry out signal processing on a single-carrier signal and a multi-carrier signal by making use of a plurality of common filters shared by said single-carrier signal and said multi-carrier signal, wherein
in said signal processing carried out on said single-carrier signal,
said filters are used to form equalizers,
some of said filters are used for equalizing an input signal supplied to a specific one of said equalizers, and
the remaining ones of said filters are used for equalizing a signal output by said specific equalizer, whereas
in said signal processing carried out on said multi-carrier signal,
said filters are connected to each other in series and said filters connected to each other in series are used for carrying out signal processing determined in advance.

2. The signal processing apparatus according to claim 1 wherein
said filters are two variable-coefficient filters each having variable tap coefficients each serving as a filter coefficient,
in said signal processing carried out on said single-carrier signal,
a specific one of said two variable-coefficient filters forms an FFE (Feed Forward Equalizer) for carrying out processing on said single-carrier signal, and the other one of said two variable-coefficient filters forms a DFE (Decision Feedback Equalizer) for carrying out processing on a signal output by said FFE, whereas in said signal processing carried out on said multi-carrier signal, said two variable-coefficient filters form a FIR (Finite Impulse Response) filter for carrying out filtering on a PN (Pseudo Noise) group, which has been inserted into said multi-carrier signal at a transmission time, by making use of a characteristic of a transmission line used for transmitting said multi-carrier signal.

3. The signal processing apparatus according to claim 2 wherein said circuitry includes:

said two variable-coefficient filters, an adder for adding said signal output by said specific variable-coefficient filter forming said FFE to a signal output by said other variable-coefficient filter forming said DFE, a determiner for carrying out hard determination on a signal output by said adder, a coefficient updating block for updating said tap coefficients of said specific variable-coefficient filter forming said FFE and said tap coefficients of said other variable-coefficient filter forming said DFE on the basis of said signal output by said adder and a result produced by said determiner as a result of said hard determination carried out on said signal output by said adder, a PN reproduction block for reproducing said PN group, an inference block for inferring said characteristic of said transmission line, a subtractor for subtracting a signal output by said FIR filter from said multi-carrier signal which is an OFDM (Orthogonal Frequency Division Multiplexing) signal and outputting a post-PN-elimination signal defined as said multi-carrier signal with said PN group removed as a subtraction result, and a distortion correction portion for removing distortions from said post-PN-elimination signal on the basis of said characteristic of said transmission line.

4. The signal processing apparatus according to claim 3 wherein, in said signal processing carried out on said single-carrier signal, said specific variable-coefficient filter forms said FFE, said other variable-coefficient filter, said adder and said determiner form said DFE, said other variable-coefficient filter carries out filtering on said result produced by said determiner as a result of said hard determination carried out on said signal output by said adder, said adder adds said signal output by said specific variable-coefficient filter forming said FFE to said signal output by said other variable-coefficient filter forming said DFE, and said determiner carries out hard determination on said signal output by said adder, and said signal output by said adder is used as a result of equalization carried out on said single-carrier signal.

5. The signal processing apparatus according to claim 3 wherein, in said signal processing carried out on said multi-carrier signal, said two variable-coefficient filters form said FIR filter, said inference block infers said characteristic of said transmission line from said multi-carrier signal, said FIR filter carries out filtering on said PN group by making use of impulse responses of said characteristic of said transmission line as said tap coefficients, said subtractor subtracts said signal output by said FIR filter from said multi-carrier signal and outputs said post-PN-elimination signal, and said distortion correction portion removes distortions from said post-PN-elimination signal by carrying out FFT (Fast Fourier Transform) processing on said post-PN-elimination signal and said characteristic of said transmission line, and dividing said post-PN-elimination signal completing said FFT processing by said transmission-line characteristic completing said FFT processing.

6. The signal processing apparatus according to claim 3 wherein said specific variable-coefficient filter is an N-tap filter including N latch circuits, N multipliers each used for multiplying data latched in one of said N latch circuits by one of said tap coefficients, and an adder for summing up signals output by said N multipliers, said other variable-coefficient filter is an M-tap filter including M latch circuits, M multipliers each used for multiplying data latched in one of said M latch circuits by one of said tap coefficients, and an adder for summing up signals output by said M multipliers, and said FIR filter formed by said two variable-coefficient filters in said signal processing carried out on said multi-carrier signal is an (N +M)-tap filter.

7. A signal processing method comprising driving a signal processing unit to carry out signal processing on a single-carrier signal and a multi-carrier signal by making use of a plurality of common filters shared by said single-carrier signal and said multi-carrier signal, wherein in said signal processing carried out on said single-carrier signal, said filters are used to form equalizers, some of said filters are used for equalizing an input signal supplied to a specific one of said equalizers, and the remaining ones of said filters are used for equalizing a signal output by said specific equalizer, whereas in said signal processing carried out on said multi-carrier signal, said filters are connected to each other in series and said filters connected to each other in series are used for carrying out signal processing determined in advance.

8. A non-transitory computer readable medium storing a program to be executed by a computer, which when executed cause the computer to serve as:

a signal processing unit configured to carry out signal processing on a single-carrier signal and a multi-carrier signal by making use of a plurality of common filters shared by said single-carrier signal and said multi-carrier signal, wherein in said signal processing carried out on said single-carrier signal, said filters are used to form equalizers, some of said filters are used for equalizing an input signal supplied to a specific one of said equalizers, and the remaining ones of said filters are used for equalizing a signal output by said specific equalizer, whereas in said signal processing carried out on said multi-carrier signal, said filters are connected to each other in series and said filters connected to each other in series are used for carrying out signal processing determined in advance.

* * * * *